US012452217B2

(12) United States Patent
Sharp et al.

(10) Patent No.: US 12,452,217 B2
(45) Date of Patent: Oct. 21, 2025

(54) PRIVATE ARTIFICIAL INTELLIGENCE AND DATA EXCHANGE

(71) Applicant: DIGITAL PORPOISE, LLC, Austin, TX (US)

(72) Inventors: Christopher Sharp, Broomfield, CO (US); Travis Duane Ewert, Highlands Ranch, CO (US); Daniel Brian Letort, Gulfport, MS (US); Scott William Mills, Highlands Ranch, CO (US)

(73) Assignee: DIGITAL PORPOISE, LLC, Austin, TX (US)

( * ) Notice: Subject to any disclaimer, the term of this patent is extended or adjusted under 35 U.S.C. 154(b) by 0 days.

(21) Appl. No.: 18/941,636

(22) Filed: Nov. 8, 2024

(65) Prior Publication Data
US 2025/0310301 A1    Oct. 2, 2025

Related U.S. Application Data

(60) Provisional application No. 63/571,918, filed on Mar. 29, 2024.

(51) Int. Cl.
*H04L 9/40*    (2022.01)
*H04L 67/10*    (2022.01)

(52) U.S. Cl.
CPC .......... *H04L 63/0272* (2013.01); *H04L 67/10* (2013.01)

(58) Field of Classification Search
CPC .................. H04L 63/0272; H04L 67/10
See application file for complete search history.

(56) References Cited

U.S. PATENT DOCUMENTS

| 11,620,473 | B1 | 4/2023 | Zhang |
| 2021/0090719 | A1* | 3/2021 | Teeuwen ............ H04N 1/00095 |
| 2022/0279321 | A1* | 9/2022 | N ............................ H04W 4/14 |

(Continued)

FOREIGN PATENT DOCUMENTS

CN    116781539 A    9/2023

OTHER PUBLICATIONS

International Search Report and Written Opinion for International Application No. PCT/US2025/021807, mailed on Jun. 3, 2025, 08 pages.

*Primary Examiner* — Pei Yong Weng
(74) *Attorney, Agent, or Firm* — Sterne, Kessler, Goldstein & Fox P.L.L.C.

(57) ABSTRACT

In an embodiment, a method provides an environment for privately exchanging data for AI tasks. Identification of a task to perform, and a characteristic describing data needed to execute the task, is received. A data provider within the environment is located that has access to a data set according to the characteristic. A task provider within the environment is located. The located task provider is configured to execute the task. A real-time, private, and secure network connection between the data provider and the task provider is established. The established connection is configured such that the data provider and the task provider are able to communicate via the network connection without using publicly accessible network addresses. The data set is transferred from the data provider to the task provider via the established network connection. In response to the transfer, the task provider executes the task using the data set.

28 Claims, 9 Drawing Sheets

(56) References Cited

U.S. PATENT DOCUMENTS

2023/0127007 A1\* 4/2023 Sekhar ................ H04L 63/0428
　　　　　　　　　　　　　　　　　　　　713/151
2024/0054406 A1　 2/2024 Bhise et al.

\* cited by examiner

PRIVATE ARTIFICIAL INTELLIGENCE AND DATA EXCHANGE

CROSS REFERENCE TO RELATED APPLICATIONS

This application claims benefit of and priority to U.S. Application No. 63/571,918, filed Mar. 29, 2024, which is hereby incorporated by reference in its entirety.

FIELD

The field relates to a private exchange for data and artificial intelligence related tasks.

BACKGROUND

Recent advances in artificial intelligence (AI) and machine learning (ML) have rapidly increased: (1) the number of entities operating in the space; (2) the amount and quality of data for AI and ML; and (3) the amount and quality of hardware dedicated to AI and ML. Often times, these entities may leverage data centers to perform their functions.

As a result of the influx of entities operating in this space, the entities may be increasingly specialized. For example, a company may be formed and dedicated to gathering data and constructing data sets for training and testing purposes. A separate company may be dedicated towards building and deploying hardware specifically for training machine learning models. In addition to specialized capabilities, entities may be wary of hosting or making their data, models, or capabilities, accessible via a public internet. A further effect of this specialization is a need to identify and locate other entities with desired capabilities. For example, an entity specializing in model training may need to locate and utilize high-quality data sets. Thus, improved methods of locating and connecting AI-related entities, via secure, private networks, are needed.

SUMMARY

In an embodiment, a method provides an environment for privately exchanging data to perform AI tasks. In the method an identification of: (i) a task to perform; and (ii) a characteristic describing data needed to execute the task, is received. A data provider within the environment is located. The located provider has access to a data set according to the characteristic is located. A task provider within the environment is located. The located task provider is configured to execute the task. A real-time, private, and secure network connection between the data provider and the task provider is established. The established connection is configured such that the data provider and the task provider are able to communicate with one another via the network connection without using publicly accessible network addresses. The data set is transferred from the data provider to the task provider via the established network connection. In response to the transfer, the task provider executes the task using the data set.

System, device, and computer program product aspects are also disclosed.

Further features and advantages, as well as the structure and operation of various aspects, are described in detail below with reference to the accompanying drawings. It is noted that the specific aspects described herein are not intended to be limiting. Such aspects are presented herein for illustrative purposes only. Additional aspects will be apparent to persons skilled in the relevant art(s) based on the teachings contained herein.

DESCRIPTION OF DIAGRAMS

The features and advantages of the example embodiments described herein will become apparent to those skilled in the art to which this disclosure relates upon reading the following description, with reference to the accompanying drawings.

In the drawings, like reference numbers generally indicate identical or similar elements. Additionally, generally, the left-most digit(s) of a reference number identifies the drawing in which the reference number first appears.

Figure 1:
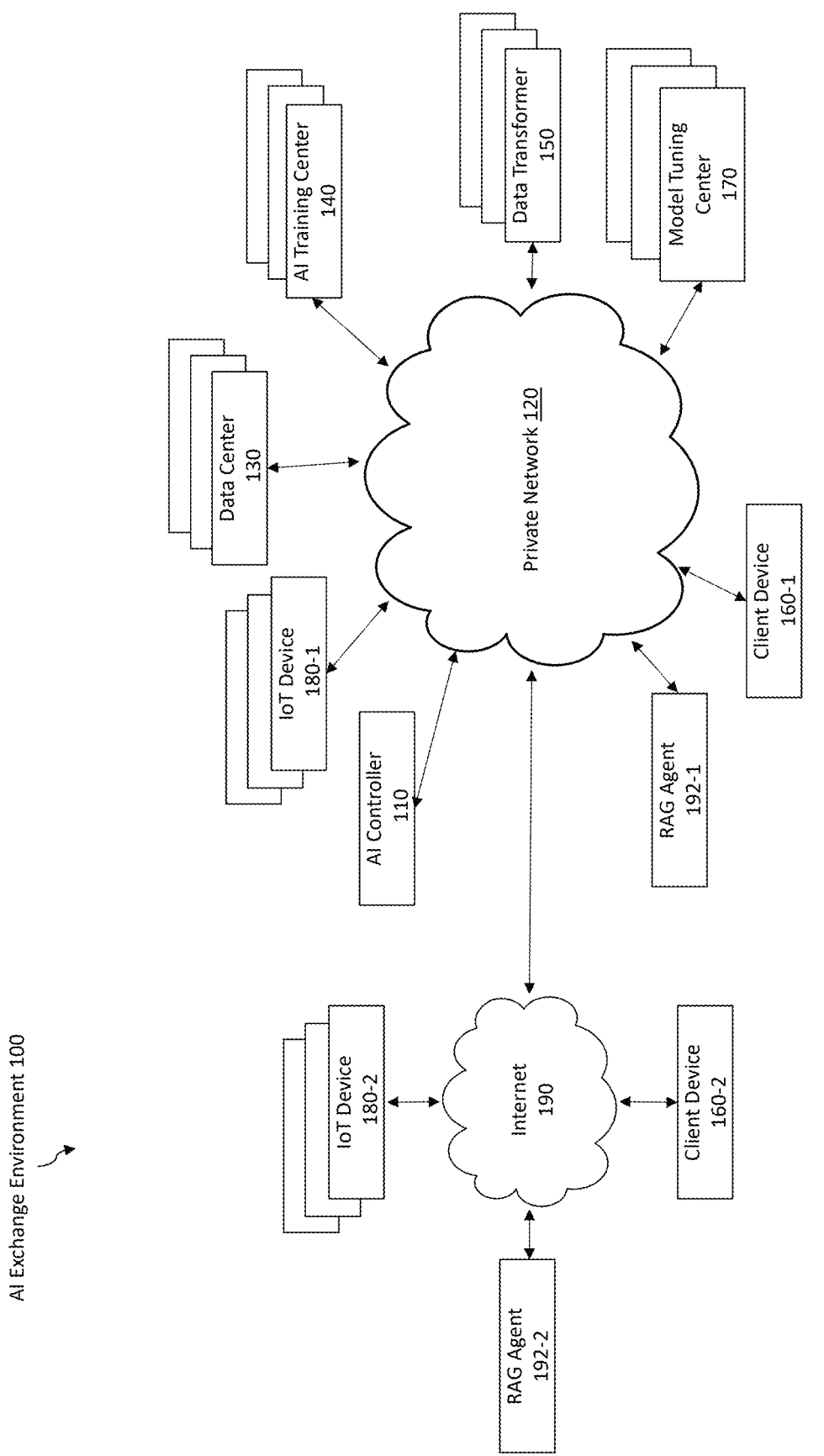
FIG. 1 is a block diagram illustrating various functional components of an environment that provides a private AI and data exchange, according to an embodiment.

Aspects of the present disclosure will be described with reference to the accompanying drawings.

DETAILED DESCRIPTION

Provided herein are system, apparatus, device, method and/or computer program product embodiments, and/or combinations and sub-combinations thereof, for providing a private AI and data exchange. The private AI and data exchange described herein may utilize an AI controller to orchestrate the execution of various tasks over a private, real-time, and secure network. The AI controller may further provide an interface to allow devices to interact with the AI controller and other connected entities.

Current systems may perform various AI related tasks such as gathering and transforming data, and training, tuning, and deploying models. However, these entities are often isolated from one another. Additionally, if these entities wish to collaborate, they may be forced to use the public internet. For example, an entity may consume publicly available data into a secure environment. This is undesirable because of the security risks involved. For example, an entity may inadvertently import malware or otherwise corrupt their environment by accessing a public network such as the internet. Additionally, an entity that has spent millions of dollars to collect and construct high-quality data sets, may not want to place that data on a network accessible via a public internet. Similarly, an entity training a model for proprietary purposes may not wish to allow the model to be accessible via a public internet. A downstream effect of this isolation is that entities are unaware of others within the AI space.

A solution to this problem is to use an AI controller, as will be discussed in more detail below, to connect AI-related entities via a global, real-time, private, and secure network, and create an AI partner ecosystem. The global, real-time, private, and secure network may include four functional layers or planes: (1) an experience plane (e.g., user interface interaction); (2) a control plane (e.g., the AI controller and related framework, may follow a Software Defined Networking (SDN) reference model); (3) a data plane (e.g., an exchange or fabric); and (4) an infrastructure plane.

Connections on the global, real-time, private, and secure network may be AI on-ramps, providing private connectivity. For example, a data center may access the real-time, private, and secure network via an AI on-ramp. The AI controller may interface and coordinate with entities such as public RAG agents, private RAG agents, hardware for model inferencing, and data centers. The solution may further use hybrid AI, or a combination of public and private data. For example, the AI controller may leverage both public and private data sets to train and deploy a machine learning model.

Each entity may be connected to the real-time, private, and secure network via an AI on-ramp. The AI controller may leverage existing data center architecture to accomplish this task. Current AI systems may use data centers to house data and train machine learning models. An AI controller may use established OSI Layers 1 (physical), 2 (Ethernet), and/or 3 (private subnet or private address space) connections (e.g., the data plane) between the data centers to facilitate the execution of various AI tasks. These connections may be made private, thus obviating the concern of communicating data, models, or other related information via a public internet. For example, a first data set may exist at a data center on a private virtual local area network (VLAN), and a second data set may exist on the internet, accessible via a public API. The AI controller may retrieve the public data set via the API, and combine it with the first data set on the private VLAN, thus allowing the second data set to be utilized without exposing the first data set to the internet.

Additionally, the AI controller may be configured to determine which entities are allowed on the private network, and what resources they may access, thus further improving computer and network security. Furthermore, using a dedicated private network, as opposed to the internet, will increase the performance of executing various tasks because the private network will have less network traffic than the public internet. Additionally, utilizing hybrid AI (e.g., utilizing both public and private resources for AI tasks), greater performance will be achieved. For example, current systems may only use public or private resources. However, since AI tasks such as model training benefit from more data, leveraging both public and private resources will lead to increased performance.

FIG. 1 is a block diagram illustrating various functional components of an environment that provides a private AI and data exchange, according to an embodiment. AI exchange environment 100 includes AI controller 110, private network 120, data center 130, AI training center 140, data transformer 150, client device 160, model tuning center 170, IoT device 180, internet 190, and retrieval augmented generation (RAG) agent 192.

AI controller 110 may be implemented using one or more servers and/or databases. In some embodiments, AI controller 110 may be implemented using a computing device such as a desktop workstation, laptop or notebook computer, netbook, tablet, smart phone, and/or other computing device. In some embodiments, AI controller 110 may be implemented as an application in an enterprise computing system and/or a cloud-computing system. In some embodiments, AI controller 110 may be a computer system such as computer system 900 described with reference to FIG. 9.

AI controller 110 may perform software-defined networking orchestration and automation within AI exchange environment 100. AI controller 110 may be configured to orchestrate task execution within AI exchange environment 100. Tasks may include, but are not limited to, data ingestion (e.g., data transfer), data transformation, model training, model tuning, model deployment, enabling RAG, data fusion, and model utilization (e.g., generating predictions with a model). AI controller 110 may orchestrate and communicate with entities on private network 120 and internet 190 to accomplish the tasks. Tasks may be performed by task providers.

For example, AI controller 110 may orchestrate a data transfer between two entities. As will be discussed in more detail below, AI controller may function as a control plane within the private, secure, and real-time network. Here, AI controller may orchestrate the transfer. The first entity may send a request to AI controller 110 including a source of the data (e.g., a data provider) and a destination. AI controller 110 may orchestrate the data transfer between the source (e.g., the data provider) and destination via a private, secure, real-time connection (e.g., private network 120). As will be discussed in more detail below, the data may be sent via a data plane within the network. In some embodiments, an entity may request data from AI controller 110. Here, AI controller 110 may locate data matching the request in the description at a data provider, and cause it to be sent to the requesting entity. In some embodiments, the transfer may be a one-time transfer. Here, the data may be sent via the private network 120, and once the transfer is complete, the connection may be torn down. In some embodiments, the transfer may be a stream of data. Here, a connection may be established via private network 120, and data may be sent continuously as it's collected or generated.

Private network 120 may be a private, secure, real-time network. Private network 120 may connect entities via one or more of a private physical OSI layer 1 connection (e.g., an optical network exchange), a private Ethernet OSI layer 2 connection, a private Internet Protocol address space that is separate from a public internet, or a combination thereof. In some embodiments, private network 120 may be further configured to support new interoperable protocols configured to support data exchange and AI node coordination. AI node coordination may involve tasks including training, transferring weights (e.g., models), backpropagation, etc. Example protocols include, but are not limited to, distributed Ethernet, ultra-Ethernet traffic, InfiniBand, Tesla Transport Protocol over Ethernet traffic, RDMA over Converged Ethernet, bottleneck, bandwidth, and round-trip (BBR) congestion control, sparse wrapper algorithm (SWAG) for ML/AI, among others. BBR congestion control may be used to manage network traffic for training synchronization. SWAG may be used to support deep learning tasks with spare data. Internet 190 may be a public internet. Private network 120 may include a data plane where all data within private network 120 travels. Private network 120 may further include one or more functional layers or planes. These functional layers may be distinct from the OSI layers mentioned above.

The functional layers may be used to describe the type of data travelling within the data plane at private network 120. Functional layers may include an experience plane and a control plane. Traffic belonging to each of these planes may be sent over the data plane. In some embodiments, the experience and control planes may be logical designations.

For example, data at each of these planes may travel through a single connection at the data plane of private network 120. In some embodiments, the experience and control planes may be partitioned within the data plane at private network 120. Here, although traffic still flows at the data plane, the experience and control plane traffic may be partitioned (e.g., separate). In some embodiments, the experience and control planes may be implemented as separate networks on top of private network 120.

Private network 120 may label or designate traffic as belonging to a layer or plane for network organization. For example, orchestration by AI controller 110 may be designated as occurring at the control layer, although all data and network traffic occurs at the data plane.

The experience plane may be used to describe communications that relate to GUIs, portals, APIs, and deployed models. For example, client device 160-1 may access a GUI at AI controller 110 to cause a task to be performed, such as analysis by a machine learning model. The GUI may allow for multimodal interactions. Client device 160-1 may interact with AI controller 110 using text, images, video, sensor data, audio, or a combination thereof. For example, client device 160-1 may submit a photo along with a question to caption the photo. Data as part of this interaction, although sent via the data plane, may be labeled as occurring within the experience plane at private network 120.

The control plane may be used to orchestrate (e.g., coordinate) task execution within private network 120. The control plane may be AI controller 110. AI controller 110 may follow a Software Defined Networking (SDN) reference model. For example, communications from AI controller 110, such as those indicating to entities (e.g., data center 130) where to send data, where to store data, where to deploy a model, and where to send data for transformation may be designated as operating within the control plane.

Private network 120 may reference an additional infrastructure layer. The infrastructure layer may be used to describe what entities are physically connected to private network 120 (e.g., the AI ecosystem). These entities may be connected to the data plane of private network 120 in order to send and receive data at private network 120. The infrastructure layer may include the physical resources to enable virtual and/or logical partitions within private network 120. As will be discussed below, AI controller 110 may manage these resources based on needs at private network 120.

The infrastructure layer may also be used to describe space and power usage, attached hardware and software application infrastructure. The infrastructure layer may also include OSI Layer 2 and 3 connection information in order to support elastic connectivity, as will be discussed below. The infrastructure layer may be further used to describe resource usage. Resource usage may include device specific network usage (e.g., a server at data center 130, client device 160-1), RAM usage, and CPU usage. Resource usage may also include AI accelerator usage. An AI accelerator may be a processing unit used to perform artificial intelligence and/or machine learning tasks. This may include usage by graphics processing units (GPUs), tensor processing units (TPUs), intelligence processing units (IPUs), and neural processing units (NPUs).

As a use case, client device 160-1 may connect to AI controller 110 and use an interface to describe a task to be performed within AI exchange environment 100. The task may be to train a large language model, using a dataset including English fiction novels, deploy the LLM at AI training center 140-1, and open an API to the LLM. Accessing and communicating with AI controller via the interface may be labeled as occurring within the experience plane, although the data is actually sent via the data plane. AI controller 110 may subsequently: (1) locate the specified data set (e.g., at data center 130); (2) specify where to send the data set (e.g., AI training center 140-1); and (3) specify where to store the trained model. Tasks by AI controller 110 may be designated as occurring via the control plane. Next, data center 130 may send the data to AI training center 140-1. AI training center 140-1 may then train the model and open the API. Interactions with the API may be designated as occurring at the experience plane.

AI controller 110 may be further configured to implement elastic connectivity to dynamically change network parameters throughout private network 120. For example, AI controller 110 may scale connections based on the needs of private network 120. Connections may be assigned different connection types (OSI Layer 1, 2, or 3) and bandwidth amount (e.g., 1 Gbps, 10 Gbps, 100 Gbps, 400 Gbps, 800 Gbps or above via an optical exchange, or similar). Thus, based on estimated and current usage, connection types and bandwidth amounts may be reallocated to improve task performance. For example, if a 10 TB transfer is occurring, AI controller 110 may cause bandwidth to be increased by reallocating unused portions of private network 120, or establishing new connections on private network 120.

Client device 160 may be a computer system such as computer system 900 described with reference to FIG. 9. Client device 160 may be a client system such as a desktop workstation, laptop or notebook computer, netbook, tablet, smart phone, and/or other computing device that may be using an enterprise computing system. Client device 160 may interface with AI controller 110 to perform AI related tasks.

Client device 160 may be connected to private network 120 and/or internet 190. For example, client device 160-1 may be connected to private network 120, whereas client device 160-2 may be connected to internet 190. Here, client device 160-2 may be unable to directly access devices on private network 120. However, AI controller 110 may interface with client device 160-2 to execute tasks.

Client device 160 may interface with AI controller 110 to orchestrate (e.g., cause) tasks to be performed. For example, client device 160 may use a graphical user interface hosted by AI controller 110 to select a task for AI controller 110 to orchestrate. AI controller 110 may send results, or orchestrate sending of results to client device 160. For example, client device 160 may identify a data set to be transformed and then transferred to a location on private network 120, such as data center 130. Once located, the data set may be transferred to an entity to perform the transformation, such as data transformer 150. Once transformed, the data set may be sent to data center 130. AI controller 110 may confirm the transfer by querying data center 130. In response, AI controller 110 may send a message or alert to client device 160, indicating the transfer is complete.

As part of the task, AI controller 110 may add or establish connections to entities on private network 120. These connections may be AI on-ramps, such that the entity has a dedicated, direct, private, and secure connection to private network 120. For example, client device 160-1 may request AI controller 110 train and deploy a model at AI training center 140. Once trained, AI controller 110 may instantiate a connection between client device 160-1 and AI training center 140 via private network 120. The connections may be real-time, private, and secure network, allowing communications via the connection without using publicly accessible network addresses. This is beneficial to ensure that data communicated over and residing on private network 120 remains secure.

AI controller 110 may be further configured to utilize elastic connectivity. Elastic connectivity may be used to dynamically change parameters associated with the established connections at private network 120. For example, AI controller 110 may determine what kind of connection (OSI Layer 1, 2, or 3) to utilize and the bandwidth (1 Gbps, 10 Gbps, 100 Gbps, 400 Gbps, 800 Gbps or above via an optical exchange, or similar) allocated to the connection. AI controller 110 may make the determination based on the task. For example, AI controller 110 may establish a larger bandwidth connection to transfer a 10 TB training data set, and a smaller bandwidth connection to transfer a 10 GB trained model. AI controller 110 may further update the connection throughout the task. For example, if a task (e.g., data transfer) is taking longer than expected and is maximizing the connection's bandwidth, AI controller 110 may increase the connection's bandwidth in order to speed up the process. In some embodiments, AI controller 110 may tear down connections once a task is complete. For example, a connection may be torn down following a single data transfer. In some embodiments, AI controller 110 may configure connections to persist. This may be useful in a scenario where data is expected to flow indefinitely.

In some embodiments, AI controller 110 may require client device 160 to login or perform an authentication process prior to executing a task. The first time client device 160 connects to AI controller 110, client device 160 may perform a registration process. Registration may include creating a username, password, and if applicable, identifying entities it wishes to add to private network 120. For example, client device 160-1 may be associated with an entity that owns data center 130, and therefore designate data center 130 to be added to private network 130. AI controller 110 may allow or deny requests from client device 160. For example, a task received from client device 160-1 via private network 120 may have access to more data than a task received from client device 160-2 via internet 190.

AI controller 110 may further include a manifest defining: (1) each entity on private network 120; (2) what entities may contact or communicate with each other; and (3) what tasks an entity may be involved in. Each entity on private network 120 may be identified via an identifier such as "Data Center 1," or "AI Training Center 1." AI controller 110 may further allow or block communications between entities. For example, an entity (e.g., data center 130) may not wish to be reached by any entity on private network 120 other than AI controller 110. Here, AI controller 110 may not establish communications between data center 130 and any other entity on private network 120. AI controller 110 may be further configured to allow and block tasks based on those defined in the manifest. For example, a first data center 130 may allow a model to be trained using its data, whereas a second data center 130 may not allow a model to train using its data. These configurations may be made and updated by the entity (e.g., data center 130) and/or client device 160 associated with the entity.

AI controller 110 may allow for further granularity. As will be discussed below, entities on private network 120 (e.g., data center 130, AI training center 140, data transformer 150, and model tuning center 170) may include data or resources that are affiliated with multiple different customers or partners. Here, AI controller 110 may track ownership and access permissions for specific resources at each entity. For example, data center 130 may house data owned by two different entities. Similarly, AI training center 140 may include computing resources (e.g., RAM, CPUs), where a first resource cluster is owned by a first partner and a second resource cluster is owned by a second partner.

AI controller 110 may be configured to orchestrate, allow, and deny tasks based on specific resource ownership and permissions within an entity on private network 120. For example, client device 160-1 may be associated with the owner of a first server at data center 130. Client device 160-2 may be associated with the owner of a second server at the same data center 130. In response to a data transfer request from client device 160-2, AI controller 110 may determine the transfer is allowed, and cause data to be transferred from client device's 160-1 server to client device's 160-2 server. AI controller 110 may make the determination by referring to the manifest discussed above or by sending a communication to and receiving a response from client device 160-1.

Data center 130 may be a facility that houses and operates various types of computing, networking, and storage equipment, as well as the power, cooling, security, and connectivity systems that support them. Data center 130 may enable the processing, storage, and transmission of large amounts of data for various purposes, such as cloud computing, web hosting, online services, e-commerce, artificial intelligence, and big data analytics. Data center 130 may store one or more data sets. Data at data center 130 may be public, private, or a combination thereof. For example, one portion of a data set may be publicly accessible, whereas a different part may be private. Data center 130 may include data affiliated with multiple entities. For example, data center 130 may be any Digital Realty, 3rd party, or Hyperscale/Cloud Data Center with high-speed/secure connectivity (private connectivity as AI-onramps), that includes Digital Realty customers and partners (buyers and sellers of AI services). For example, a first customer associated with client device 160-1 and a second customer associated with client device 160-2 may both store their respective data set at data center 130.

Data sets may be created, updated, edited, and used by entities within AI exchange environment 100. These processes may be based on authorization levels, commercial terms of use (e.g., dataset-as-a-service, pay per use, pay per download), or a combination thereof. For example, a retailer associated with client device 160-1 may create a data set including all its transaction data. Client device 160-1 may send the transaction data to data center 130 for storage. As stated above, data at data center 130 may be public, private or a combination thereof. Here, client device 160-1 may designate what portion, if any, of their data at data center 130 is accessible by other entities (e.g., client device 160-2).

AI training center 140 may be an entity capable of training a machine learning model. AI Training Center 140 may be a Digital Realty, 3rd party, or Hyperscale/Cloud Data Center with large-scale/high-density computing resources for training and re-training foundational models as provided by an AI Ecosystem Partner, and used/leveraged by a Digital Realty customer. This may include large foundational models that are trained (GPT-4, etc.) or small domain models that are re-trained to be updated and redeployed. Models may be retrained, updated, and/or redeployed at any frequency (e.g., daily, weekly, monthly).

AI training center 140 include one or more GPUs, TPUs, IPUs, NPUs, CPUs, RAM, storage devices, and networking interfaces. AI training center 140 may include any number of GPUs, TPUs, IPUs, NPUs, CPUs, RAM, storage devices, and networking interfaces. AI training center 140 may include any number of contiguous clusters of GPUs, TPUs, IPUS, NPUs, and/or CPUs. A cluster may include any number (e.g., ten, hundred, thousand) of computing elements. Resources at AI training center 140 may be affiliated with multiple different owners, customers, or end users. For example, client device 160-1 may have access to a first GPU cluster at AI training center 140 and client device 160-2 may have access to a second GPU cluster at AI training center 140. AI training center 140 may train a model with data from data center 130 in response to a request from client device 160. In some embodiments, data center 130 may transmit data for training to AI training center 130. In some embodiments, AI training center 140 may request a feed or stream of data from data center 130 during the training process. AI training center 140 may receive the data via private network 120.

Training may involve various steps such as data splitting, model selection, hyperparameter tuning, training, and validation. Data splitting may involve splitting the data set into training, validation, and testing data sets. Model selection may involve determining the type of model to train. The type of model may be, but is not limited to, a linear regression model, random forest, neural network, decision tree, support vector machine, recurrent neural network, convolutional neural network, and transformer model.

Hyperparameter tuning may be used to optimize hyperparameters that configure the training process. Hyperparameters may be used to define training batch size, learning rate, and training epochs. Hyperparameters may be tuned using techniques such as grid search and Bayesian optimization.

Training may involve iterating over examples, generating predictions, scoring the predictions, and updating the model based on the score. In some embodiments, the score may be generated by comparing the prediction to a label corresponding to the example. The label may be the ground truth of what the model is training to predict (e.g., the correct answer). For example, if the model is trained to identify fraudulent transactions, a training data example may be transaction details and the label may be a binary value, indicating whether the transaction was fraudulent. An error may be computed based on the difference between the model's prediction and the label. The error may be used to update the model. Backpropagation may be used to update the model.

Validation may involve evaluating the model's performance. Validation may utilize various performance metrics such as precious, recall, F1-score, and area under the receiver operating characteristic curve. The performance metrics may vary based on the model. For example a decision tree may use a Gini impurity score whereas a neural network may use an F1-score. Once trained, AI training center 140 may be configured to host the trained model so that it may generate and send inferences over private network 120. This may be beneficial so that entities on the network can leverage the model in order to generate predictions and inferences.

AI training center 140 may be further configured to implement checkpoints. Checkpoints may be used to save and resume progress during the training process. For example, AI training center 140 may create a checkpoint after iterating over a predefined number of training samples or after achieving a predefined performance metric. The checkpoint may include the model at the time the checkpoint is created, training data used to create the model, performance metrics used to evaluate the model, and hyperparameters used for training. The checkpoint may be saved to a file. AI training center 140 may access the checkpoint, and load the data to resume model training where the checkpoint was saved.

AI training center 140 may be further configured to utilize multiple entities for training. For example, a first AI training center 140 may leverage one or more other AI training centers 140 to all train a single model. For example each AI training center 140 may include one or more GPUs, all used to train a single model. Here, each AI training center 140 may train a model using a training data set. The training data set at each AI training center 140 may be the same, include overlapping examples, or be disjoint. Once trained, the resulting models may be sent to the first AI training center 140 for consolidation. The final model may be created by calculating the average value for each weight across all the trained models.

For example, AI controller 110 may coordinate model training using three AI training centers 140 (e.g., AI training center 140-1, AI training center 140-2, and AI training center 140-3). In some embodiments, the models may be represented by a set of numerical weights or parameters corresponding to features the model is configured to learn. The model at AI training center 140-1 may train using a first training data set, the model at AI training center 140-2 may train using a second training data set, and the model at AI training center 140-3 may train using a third training data set. Noted above, each training data set may be unique from the other training data sets, or may include overlapping training examples. Each model at each AI training center 140 may be trained.

In some embodiments, AI controller 110 may coordinate the model training according to a centralized scheme where each trained model is sent to a single entity that combines the trained models. For example, AI controller 110 may transmit a message to each AI training center 140. The message may include identification of a central entity (e.g., AI training center 140-1) to send the trained model to. Once the central entity (e.g., AI training center 140-1) receives each model, it may combine them into a single model. The central entity may combine the models into a single model by averaging the weights across the models. In some embodiments, the central entities may redistribute the combined model to each AI training center 140. In some embodiments, the central entity may not redistribute the trained models.

In some embodiments, AI controller 110 may coordinate the model training according to a decentralized scheme where each AI training center 140 broadcasts its trained model to the other AI training centers 140. AI controller 110 may provide each AI training center 140 with the address of the other AI training centers 140 on private network 120, indicating where to send the trained model. Each AI training center 140 then combines its trained model with the models received from the other AI training centers 140. For example, AI training center 140-1 may send its model to AI training center 140-2 and AI training center 140-3. Similarly, AI training center 140-2 may send its trained model to AI training center 140-1 and AI training center 140-3, and AI training center 140-3 may send its trained model to AI training center 140-1 and AI training center 140-2. Each AI training center 140 may combine the received models. For example, AI training center 140 may compute the average of the weights of each model, and use the average values as the new model (e.g., the weight averages).

In both the centralized and decentralized schemes discussed above, AI training center 140 may send the training data along with the trained model. In some embodiments, AI training center 140 may only send the model and not the training data. This may be beneficial to save bandwidth on private network 120.

Distributing model training across multiple AI training centers 140 is beneficial in a situation where each AI training center 140 has limited resources. As a result, the technique described above is used to train a robust model with limited resources by leveraging the combined resources of multiple AI training centers 140. An additional benefit of this technique is that private data may be used for training. For example, a model may be trained on private data at the first AI training center 140-1. Although second AI training center 140-2 may be unable to access the data at the first AI training center 140-1, the second AI training center 140-2 still benefits from the training on the private data because it may receive the model, or a variant (e.g., an average of multiple models) from a central entity (e.g., AI training center 140-1) that combined each model.

In some embodiments, AI controller 110 may coordinate model updates in real time during training. For example, models at each AI training center 140 may train on a certain number of examples (e.g., a batch) before updating model weights. In some embodiments, AI training center 140 may broadcast the updated weights following each batch. For example, AI training center 140-1 may send the updated weights to AI training centers 140-2 and 140-3. AI controller 110 may coordinate model training to ensure that each model is updated simultaneously. For example, AI controller 110 may signal each model at each AI training center 140 to train on a predefined number of batches. The AI training centers 140 may transmit AI controller 110 a message indicated that training on the predefined number of batches is complete. Once AI controller 110 receives a completion message from each AI training center 140, AI controller 110 may send a message to each AI training center 140 to distribute the trained models. As noted above, in a centralized scheme each AI training center 140 may send the trained models to a single entity (e.g., AI training center 140-1) to combine the models (e.g., average the model weights). The single entity may then send the combined model (e.g., averaged model weights) to each AI training center 140. In a decentralized scheme, each AI training center 140 may send its trained model to all the other AI training centers 140. Here, each AI training center 140 updates its model by averaging its model weights with the received model weights. Once each AI training center 140 either receives the updated model from the single entity, or performs the update process itself, each AI training center 140 may then send an acknowledgement to AI controller 110 that its model is updated. Once AI controller 110 receives an acknowledgement from each AI training center 140, it may send a second signal to each AI training center 140 for training to continue.

In some embodiments, AI controller 110 may change the training process from a centralized one to a decentralized, or vice versa. AI controller 110 may update the training process based on factors relating to private network 120 such as bandwidth usage, packet loss, and latency, among others. For example, in a centralized scheme AI controller 110 may detect that the central entity's (e.g., AI training center 140-1) connection to private network 120 is experiencing high latency or a high rate of packet loss. In response, AI controller 110 may signal to each AI training center 140 to switch to a decentralized training scheme or AI controller 110 may update the central entity from AI training center 140-1 to AI training center 140-2.

In some embodiments, models at each AI training center 140 may be configured to train on different data types. For example, a model at a first AI training center 140-1 may be configured to input and train on text data and a model at a second AI training center 140-2 may be configured to input and train on image data. Here, each AI training center 140 may send the trained models (e.g., the text-based model and the image-based model) to AI controller 110. In some embodiments, AI controller 110 may distribute the models to each AI training center 140 such that the first AI training center 140-2 has two models, the text-based model and the image-based model. In some embodiments, AI controller 110 may combine the models into a single, multi-modal model, and distribute the single model to each AI training center 140.

AI controller 110 may create an application programming interface (API) to facilitate model interaction. In some embodiments, the interactions may occur between client device 160 and the model directly. The model may be accessible via private network 120, internet 190, or a combination thereof. For example, if the model is located at AI training center 140, client device 160 may connect to the model at AI training center 140 via private network 120. In some embodiments, client device 160 may interact with the model through AI controller 110. Here, client device 160 may connect to AI controller 110 and use an API for model interaction. AI controller 110 may pass data between client device 160 and the model (e.g., a model at AI training center 140). This may be beneficial because client device 160 does not need to know details of the model. Instead, client device 160 may leverage AI controller 110 to determine which model to use, and to handle communications with the model.

In some embodiments, AI controller 110 may route the request from client device 160 to a model on private network 120 based on factors such as input data type, desired accuracy, computational efficiency, network latency, bandwidth availability, computational resource usage, among others. In some embodiments, AI controller 110 may interact with a load balancer, or implement a load balancing functionality. For example, the AI controller 110 may have awareness of current computing resource usage, expected computing resource usage, and/or current workloads (e.g., jobs) occurring at each entity on private network 120. AI controller 110 may have awareness by communicating with each entity, using an API, communicating with a dedicating load balancer, or any combination thereof. For example, AI controller 110 may route the request from client device 160 to a model at an AI training center 140 experiencing computational resource usage below a predefined threshold. Similarly, AI controller 110 may route the request to multiple entities (e.g., AI training centers 140). Here, a single AI training center 140 may be unable to complete the request from client device 160 based on, for example, its current computational resource usage. However, AI controller 110 may determine, based on factors of each AI training center 140, that the request may be subdivided and assigned to multiple AI training centers 140. Noted above, the factors may include input data type, desired accuracy, computational efficiency, network latency, bandwidth availability, computational resource usage, among others. For example, client device 160 may submit a request for a summary of 100 terabytes of data. Here, AI controller 110 may cause the data to be subdivided and then spread amongst multiple AI training centers 140. For example, AI controller 110 may assign 10 terabytes of data to ten different AI training centers 140. Similarly, AI controller 110 may instruct another entity on private network 120 to subdivide and/or assign tasks to each AI training center 140. This is beneficial to achieve load balancing amongst one or more AI training centers 140.

Similarly, AI controller 110 may route the request from client device 160 to a model at an AI training center 140 experiencing network latency and packet loss rate below predefined thresholds. In some embodiments, AI controller 110 may dynamically route traffic for client device 160 based on conditions at private network 120. For example, AI controller 110 may route a request from client device 160 to a model at AI training center 140-1. Subsequently, AI controller 110 may detect a condition associated with AI training center 140-1 such as a spike in computing resource usage, a spike in packet loss, a decrease in bandwidth availability, or any combination thereof. In response, AI controller 110 may route the request to a model at AI training center 140-2. As will be discussed below, AI controller 110 may utilize multiple models to handle the request from client device 160. Here, AI controller 110 may route the request to multiple models in order to generate a response.

The API may be configured to receive queries for the model. The form of the query may vary based on the model type. For example, if the model is a large language model (LLM), the query may be text based. Based on the query, the model may return a prediction or inference. For example, if the query was a question, the model may return with an answer. In some embodiments, the model may be multi-modal, capable of inputting and outputting data with various formats such as text, images, video, sensor data, audio, or a combination thereof. For example, the model may be capable of inputting an image along with text a request to identify a similar image. In response, the model may return a similar image within a data set.

In some embodiments, interactions may involve multiple models. For example, AI controller 110 may be connected to multiple machine learning models trained to perform specific tasks. For example, a first model may be trained to analyze text and a second model may be trained to analyze images. These models may be at the same location on private network 120 (e.g., AI training center 140), or spread across multiple entities on private network 120 (e.g., first AI training center 140-1 and second AI training center 140-2). Described previously, AI controller 110 may receive API calls made by client device 160 to use a machine learning model. Here, AI controller 110 may inspect the call and determine whether additional models should be used to respond. Noted above, AI controller 110 may have a manifest identifying the capabilities of entities on private network 120. The manifest may further include a list of available models, where the models are located, and a data type associated with the model (e.g., text, audio, and video). When AI controller 110 receives an API call to access a model, it may determine whether the entire API call, or part of the API call, should be sent to multiple models. For example, AI controller 110 may leverage a foundational model to determine whether the entire API call, or part of the API call, should be sent to multiple models. The foundational model may use LangChain or LlamaIndex to map the API call (e.g., the prompt) to one or more models. AI controller 110 may use the mapping to route the API call to one or more models on private network 120.

For example, client device 160 may input an image and a word document, along with a request for a model accessible by AI controller 110 to summarize both. In some embodiments, client device 160 may specify a data source on private network 120 for the model to use. For example, client device 160 may specify that the image is at data center 130-1 and the word document is at data center 130-2. AI controller 110 may detect the input data types, and map the inputs along with the request to models based on the input types. AI controller 110 may use a foundational model to identify the input types. For example, the image and request may be sent to a first model at AI training center 140-1 trained to perform image processing tasks, and the text and request may be sent to a second model at AI training center 140-2 trained to perform natural language processing.

In some embodiments, each model may return results directly to client device 160. For example, client device 160 may receive two responses, one from AI training center 140-1 and one from AI training center 140-2. In some embodiments, AI controller 110 may cause the results to be combined into a single response, and return the single response to client device 160. For example, AI controller 110 may use a foundational model to combine the results.

In some embodiments, AI controller 110 may utilize a foundational model to analyze inputs received from client device 160 and assign distinct portions of the input to specialized models for processing. The foundational model, which may reside on private network 120 in connection with AI controller 110, may be trained to receive input prompts, parse them to identify different data types (e.g., text, images, audio), and determine the most suitable specialized models based on predefined criteria such as data type, complexity, and processing requirements. For example, if the input includes both textual and image data, the foundational model may assign the text to a natural language processing model and the image to a computer vision model located on private network 120.

After the specialized models process their respective inputs, they may return the outputs to the foundational model. Trained on multi-modal datasets, the foundational model may integrate these outputs to generate a cohesive final result, such as a consolidated summary or analysis that combines insights from both the text and image data. This integrated output enhances the overall understanding and utility of the processed data.

Depending on network configurations, security protocols, and performance considerations, the foundational model may return the final output to AI controller 110. AI controller 110 may then forward the final output to client device 160 via private network 120. Alternatively, the foundational model may directly send the output to client device 160 via private network 120. This flexible routing optimizes system performance by adapting to real-time network conditions and client needs.

This method allows for efficient and dynamic processing of complex, multi-modal inputs by leveraging a foundational model to orchestrate the assignment and integration of tasks across specialized models within a private network (e.g., private network 120). It enhances processing speed, optimizes resource utilization, and provides a scalable solution adaptable to various data types and network configurations.

In some embodiments, the model may receive, and generate predictions regarding continuous data streams. For example, client device 160-1, associated with a retailer, may send a real-time stream or batches of transaction data, and leverage the model to identify fraudulent transactions. AI controller 110 may orchestrate the data to be sent via private network 120 to prevent leakage of sensitive information within the transaction details. Additionally, since private network 120 may include dedicated, physical connections, the data may be sent much faster than over a traditional publicly accessible internet connection (e.g., internet 190).

As an additional example, a factory may deploy equipment and product sensors. The sensors may be IoT device 180. The equipment sensors may be configured to monitor and generate readings regarding various aspects of the equipment such as health, temperature, vibrations, and energy usage. Product sensors may be configured to generate readings regarding product quality, defects, and assembly status (e.g., how close is product to being assembled). Client device 160-1, affiliated with the factory, may interface with AI controller 110 to establish connections between IoT device(s) 180 and a model on private network 120. The model may analyze and generate predictions based on the received equipment and product sensor data. For example, the model may interpret equipment sensors to predict that a machine has encountered an error or requires preventative maintenance. The model may analyze product sensors to infer that the product includes a defect or that a machine that assembled the product includes a defect. The model may return results to client device 160-1 via private network 120.

In some embodiments, the model may analyze data from multiple sources. For example, the model may receive the equipment and product sensor data described above, along with current inventory and pricing data from the retailer selling the products. Based on the sensor data and demand inferred from current inventory and pricing data, the model may predict: (1) expected inventory; and (2) updated prices for the products. The predictions may be sent to client device 160-1 via private network 120.

Client device 160-1 may further use AI controller 110 to build a data set from the sensor data. For example, in addition to routing the sensor data to a model, AI controller 110 may copy and send or cause the model to send the sensor data to data center 130 for storage. This data may be used for future model training and/or tuning.

AI controller 110 may leverage data transformer 150 to transform data for various tasks. Data transformer 150 may include one or more GPUs, TPUs, IPUs, NPUs, CPUs, RAM, storage devices, and networking interfaces. Resources at data transformer 150 may be affiliated with multiple different owners, customers, or end users. For example, client device 160-1 may have access to a first GPU cluster at data transformer 150 and client device 160-2 may have access to a second GPU cluster at data transformer 150. Data transformer 150 may be an entity capable of transforming data for an AI related task. Transformation may involve various steps such as: (1) projecting the data into a shared format; (2) removing irrelevant data; (3) labelling the data; (4) cleaning the data; (5) feature engineering; (6) normalization; (7) encoding the data; (8) generating embeddings; and (9) temporal aggregation and alignment.

Transforming data prior to executing a task is beneficial to ensure that: (1) the data should have a shared format; (2) irrelevant data should be removed; and (3) the data should be labeled. Creating a shared format may involve projecting the data such that all the data have the same dimensions. This may be accomplished via upsampling, downsampling, linear transformation, mirroring, rotating, and/or smoothing the data. Labels may be created based on the source and type of data. For example, data from IoT 180 device may be labelled with the type of IoT device 180 (e.g., a camera) that created the data, an identifier of IoT device 180 (e.g., camera #1), and the location of IoT device 180 (e.g., Retailer A warehouse). Real-time data may be labelled with the type of data (e.g., product price) and a source of the data (e.g., Retailer A).

Data transformer 150 may further clean the data, such as by removing duplicates, providing labels for or removing items that are missing values, and correcting inconsistent data elements. Transformation may further involve feature engineering to decide what features will be identified and learned within the data. The features may vary based on the data type and the use for the data. For example, a feature may be transaction frequency, average transaction amount, or time of day.

Data transformer 150 may further normalize data to scale numerical features within a predefined range of values. For example, a range of numbers may be normalized between two values such as 0 and 1.

Data transformer 150 may further encode the data. This may be useful to convert categorical features into numerical representations. For example, one-hot encoding may be used to identify an object type within a set of types. Data transformer 150 may also create embeddings. Embeddings may be numerical representation of data. The embeddings may be created such that the meaning of the data is maintained. For example, similar words (e.g., lake and ocean), should have more similar embedding values than dissimilar words (e.g., lake and book). Embedding techniques such as Word2Vec, BERT, and term frequency-inverse document frequency (TF-IDF) may be used.

Data transformer 150 may further be configured to perform temporal aggregation and alignment. Aggregation may involve grouping data by predefined time intervals (e.g., one day, one week, and one month). This may be useful to identify trends within the grouped intervals. Temporal alignment may involve aligning data, from multiple sources, by the time they were created. For example, a data set may include data streams from three sensors. Temporal alignment may involve grouping data from all three sensors by matching time stamps.

Model tuning center 170 may be any entity capable of tuning a machine learning model. Model tuning center 170 may include one or more GPUs, TPUs, IPUs, NPUs, CPUs, RAM, storage devices, and networking interfaces. Resources at model tuning center 170 may be affiliated with multiple different owners, customers, or end users. For example, client device 160-1 may have access to a first GPU cluster at model tuning center 170 and client device 160-2 may have access to a second GPU cluster at model tuning center 170. Tuning may involve retraining or updating a model using a dataset from a specific domain. For example, AI training center 140 may train a large language model using billions of training examples from news, movies, books, TV shows, and internet content. However, client device 160-1 may be affiliated with a specific news organization, and wish to generate content for its organization. Here, client device 160-1 may use AI controller 110 to orchestrate model tuning center 170 to tune the LLM using data specific to client device's 160-1 organization. For example, the data may be news content generated by client device's 160-1 organization. The result of the tuning process will be that the LLM is tailored to interpret and generate content for client device's 160-1 organization.

As an additional example, a model may be initially trained to detect fraudulent transactions. Subsequently, a retailer associated with client device 160-1 may cause AI controller 110 to leverage model tuning center 170 to tune the model using its own transaction data. The transaction data may be stored at data center 130. The resulting model may be optimized to identify fraudulent transactions using the retailer's specific data. This process is beneficial to save time and computing resources since the model is already trained.

IoT device 180 may be any network connected device capable of generating and sending data. IoT device 180 may include, but is not limited to, computers, TVs, speakers, cameras, microphones, thermostats, weather sensors, lighting systems, security systems, fire alarms, industrial sensors, and robotic sensors. Industrial and robotic sensors may relay industrial and robotic system information such as temperature, humidity, power, voltage, pressure, accelerometer data, gyroscope data, proximity data, infrared data, sound data, location data (e.g., GPS), and inertial measurement unit (IMU) data. IoT device 180-1 may be connected to AI controller 110 via private network 120. In some embodiments, IoT device 180-2 may be connected to internet 190. IoT device 180 may be deployed in any environment to collect data. For example, IoT device 180 may be deployed to collect weather data. As an additional example, IoT device 180 may be deployed within a factory to gather equipment health (e.g., temperature, vibration, and energy consumption) and product health (e.g., quality, defect, and assembly status).

As an example, AI controller 110 may leverage weather data from IoT device 180 and real-time pricing data from a retailer. The real-time pricing data my include product demand, inventory levels, and competitor prices. AI controller 110 may orchestrate (e.g., cause) the IoT and real-time data to be sent via private network's 120 data plane to a machine learning model for analysis. The model may be hosted anywhere on private network 120, such as at model training center 140. The model may analyze the weather and pricing data to generate predictions regarding updated pricing for certain products. For example, the model may infer that a regional snow storm is approaching and that the retailer's cold weather products are priced too low. The model may further predict that demand for the cold weather products will increase because of the snow storm, and therefore the cold weather product prices should be raised. The model may also be configured to generate marketing or display materials to increase product appeal. For example, the model may generate images, audio, video, or a combination thereof, depicting products being used in current or expected weather conditions. Results may be sent to client device 160 via private network 120.

RAG agent 192 may be used for retrieval augmented generation tasks. RAG may be a technique to edit or augment a model's prediction with additional data. RAG agent 192 may be a model integration framework. RAG agent 192 may be used to act as an interface between a model and one or more entities. For example, RAG agent 192 may act as an interface between a model and a private data set. As an additional example, RAG agent 192 may be used to integrate a model into an instant messaging application, allowing devices to leverage the model while using the instant messaging application. For example, RAG agent 192 may submit typed text to the model, and present real-time feedback (e.g., spelling errors, grammatical errors, and recommended sentence completion) from the model to the user.

RAG agent 192 may be an instance of LangChain. RAG agent 192 may be connected to any entity within AI exchange environment 100. For example, RAG agent 192-2 may be deployed in connection with internet 190, whereas RAG agent 192-1 may be connected to private network 120. AI controller 110 may instantiate, configure, and terminate RAG agent 192.

RAG agent 192 may be used to retrieve a specific or private data set. For example, client device 160-1 may query a model at AI training center 140 for information regarding data at data center 130. RAG agent 192-1 may augment the response with data from data center 130.

AI controller 110 may further configure RAG agent 192 to communicate with entities outside private network 120 to leverage hybrid AI functionality. For example, client device 160-1 may request AI controller 110 to send client device 160-1 daily news updates. In response, AI controller 110 may leverage an existing, or deploy an LLM within private network 120. For example, AI controller 110 may execute an LLM at AI training center 140. In order to retrieve the news updates, AI controller may instantiate RAG agent 192-2 in connection with internet 190. This will allow RAG agent 192-2 to retrieve news from various publicly accessible news sites without compromising entities or data on private network 120. RAG agent 192-2 may send the retrieved news to the LLM at AI training center 140. The LLM may then include the news retrieved by RAG agent 192-2 within its responses.

As an additional example, an LLM may use RAG agent 192 when responding to queries. For example, AI controller 110 may deploy an LLM accessible by an entity on the private, secure, real-time network. (e.g., private network 120). The entity may be a data center owner. To facilitate RAG, AI controller 110 may deploy one or more RAG agents 192 (e.g., LangChain instances) in connection with data center 130. When the LLM receives query, such as, "How many customers are in our data center?" the LLM may use RAG agent 192 to pull data from data center 130. The LLM may then use the data retrieved by RAG agent 192 as part of the response. For example, RAG agent 192 may have identified 10 customers, and the LLM may respond "There are 10 customers in the data center."

Utilizing RAG agent 192 has numerous advantages. First, it allows entities such as client device 160 to use a pretrained model and still interact with its own data set. Second, by deploying multiple RAG agents 192 throughout private network 120, data may be retrieved much faster. For example, a prior art system may employ a single model to fetch data, thus resulting in high latency. Here, leveraging a distributed configuration of RAG agents 192 allows the load on any individual RAG agent 192 to decrease, thus increasing both RAG agent's 192 and the model's response times. For example, multiple RAG agents 192 may be employed within data center 130 to rapidly respond to queries for data at data center 130. Additionally, RAG agents 192 allow the model to be used for low-latency access to cloud-hosted systems such as Azure OpenAI Sycs. RAG agents 192 may also allow the model to be used with service providers such as GPU-Training-as-a-Service and LLM-Training-as-a-Service providers. Additionally, RAG agents 192 allow the model to be used with private systems such as an OSS customer and partner hosted systems (i.e. model training services, GPU-as-a-Service, similar). Third, data security and privacy are maintained. In an embodiment, the model may be connected to internet 190, but RAG agent 192 may not be. Thus, RAG agent 192 may access private or proprietary data, for example at data center 130, without exposing the entire data set to the internet. Here, RAG agent 192 may only send the necessary data items to the model. This ability to leverage hybrid AI (e.g., both public and private data) increases model accuracy while also maintaining computer, network, and data security. Additionally, AI controller 110 and/or client device 160 may define permissions associated with the data. For example, client device 160 may define what entities may access their data, what portions may be accessed, or a combination thereof. Client device 160 may set the permissions using an interface at AI controller 110 when the data is added to private network 120.

As stated above, client device 160 may designate what portion, if any, of their data at data center 130 is accessible by other entities. Here, RAG agent 192 may comply with this designation. Therefore, a portion of data at data center 130 that client device 160 has designated restricted may not be accessed by RAG agent 192.

In some embodiments, AI controller 110 may orchestrate the data retrieved by RAG agents 192 to be stored into a data set. As stated above, orchestration may be designated as occurring within the control plane. The data may include metadata, customer data, automation data, private data, partner ecosystem information (e.g., GPU load utilization, network latency, and network bandwidth usage), or a combination thereof. AI controller 110 may orchestrate the storage by communicating with RAG agent 192. AI controller 110 may indicate what data to store, and a location to store it (e.g., data center 130). Subsequently, RAG agent 192 may send the data to the location (e.g., data center 130). This data set may be used for future predictions and/or model training or tuning. For example, the LLM may be retrained on an updated data set including the information retrieved by RAG agents 192. This may be beneficial to improve the LLMs performance.

In some embodiments, AI controller 110 may orchestrate (e.g., cause) transformation of the data retrieved by RAG agents 192 prior to submitting it to a model for analysis. As discussed, the orchestration may be labeled or designated at occurring via the control plane. Actual data transmission may occur within the data plane. The transformation may be used to project the data into a shared format. Citing the example above, three RAG agents 192 may have each collected data from three news sources. AI controller 110 may indicate to RAG agents 192 where to send the data for transformation (e.g., data transformer 150). RAG agents 192 may then send the data via the data plane. Data transformer 150 may then project the data into a shared format. For example, the data may be transformed into embeddings (e.g., numerical vectors). The embeddings may have equal dimensions. Once transformed, AI controller 110 may orchestrate the data to be sent to the LLM for analysis.

Figure 2:
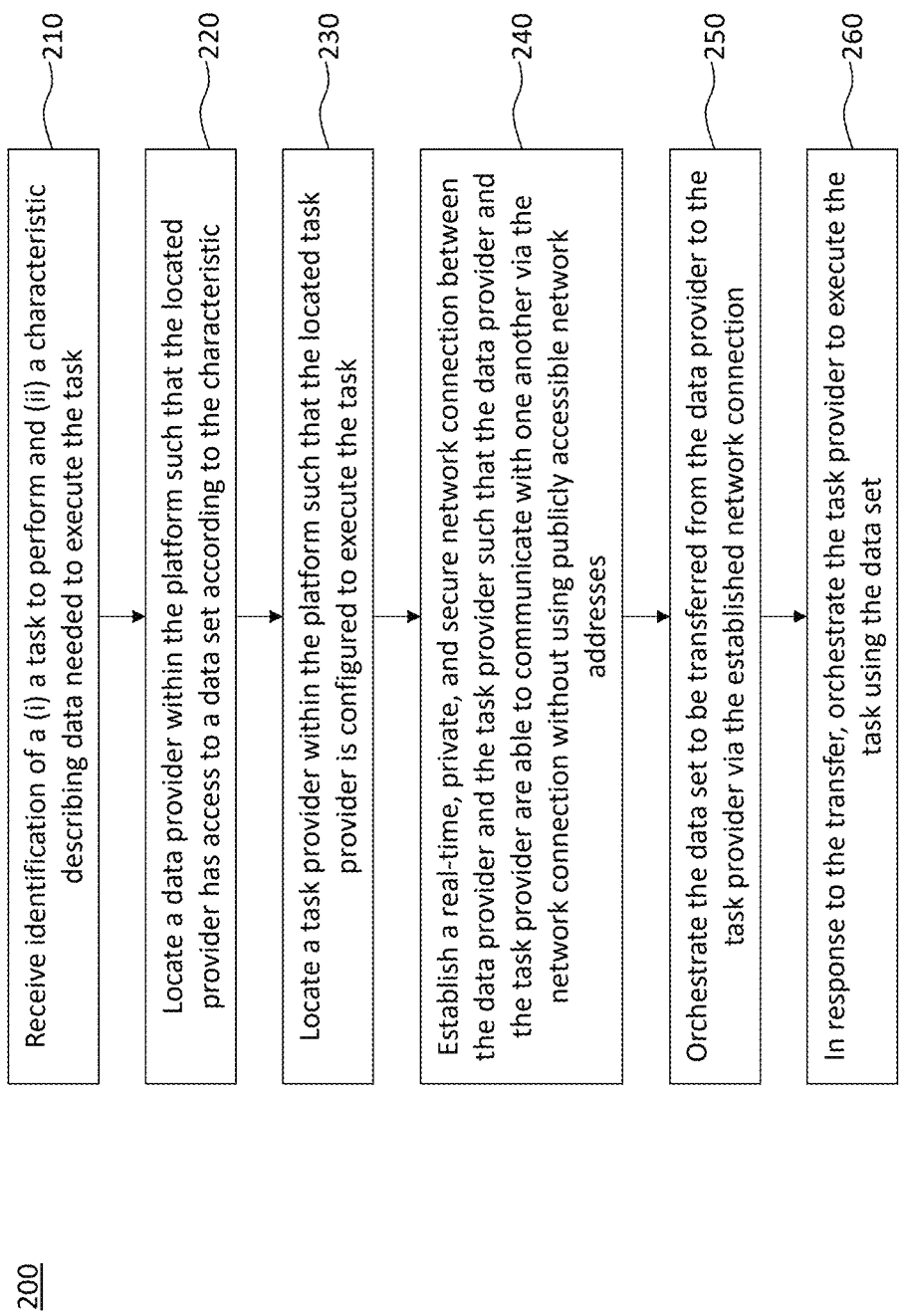
FIG. 2 is a flowchart illustrating a method for providing a private AI and data exchange, according to an embodiment.

FIG. 2 is a flowchart illustrating a method 200 for providing a private AI and data exchange, according to an embodiment. Method 200 shall be described with reference to FIG. 1, however, method 200 shall not be limited to that example embodiment.

The foregoing description will describe an embodiment of the execution of method 200 with respect to AI controller 110. While method 200 is described with reference to AI controller 110, method 200 may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 2.

At step 210, AI controller 110 receives identification of a (i) a task to perform and (ii) a characteristic describing data needed to execute the task. AI controller 110 may receive the task from client device 160. Client device 160 may be associated with a customer, partner, provider, or end user of an entity on private network 120. For example, client device 160 may be associated with the owner of data at data center 130. The task may be any AI related task including, but not limited to, data ingestion (e.g., data transfer), data transformation, model training, model tuning, model deployment, enabling retrieval augmented generation, data fusion, and model utilization (e.g., generating predictions with model). In some embodiments, the task may involve multiple subtasks or components. For example, model utilization may involve data transfer, transformation, and model training and deployment.

The characteristic may be used to identify data that is needed for the task. The characteristic may include, but is not limited to, a type of data (e.g., image, video, and text data) and a quantity of data. In some embodiments, multiple characteristics may be specified. For example, data sets having characteristics such as 1 million samples of English text, and 1 million images of animals may be specified. The task and characteristic may be received via an interface hosted by AI controller (e.g., via the experience plane).

At step 220, AI controller 110 locates a data provider within the environment such that the located provider has access to a data set according to the characteristic. The data provider may be any entity on private network 120, such as data center 130. In some embodiments, AI controller 110 may have a directory or manifest indicating the data that each entity on private network 120 has access to. In some embodiments, AI controller 110 may search private network 120 to find a data provider. For example, AI controller 110 may query each entity on private network 120 to locate a data provider with access to a dataset having the characteristic.

At step 230, AI controller 110 locates a task provider within the environment such that the located task provider is configured to execute the task. The task provider may be any entity on private network 120 capable of executing the task. For example, if the task is training a machine learning model, the task provider may be AI training center 140. As stated above, AI controller 110 may have a directory or manifest listing entities on private network 120 and tasks they are configured to execute. Similarly, AI controller 110 may locate the task provider by querying entities on private network 120. AI controller 110 may select a task provider that has permission to access to the data at data provider. As stated above, data providers (e.g., data center 130, client device 160) may designate what portion, if any, of their data is accessible by other entities. Here, AI controller 110 may confirm that the task provider has permission to access data at the data provider. This may be accomplished by querying the data provider and/or accessing a manifest at AI controller 110.

At step 240, AI controller 110 establishes a real-time, private, and secure network connection (e.g., an AI on-ramp) between the data provider and the task provider. AI controller 110 may configure the connection such that the data provider and the task provider are able to communicate with one another via the network connection without using publicly accessible network addresses. The real-time private, and secure network connection may include one or more of a private physical OSI layer 1 connection (e.g., an optical network exchange), a private Ethernet OSI layer 2 connection, or a private Internet Protocol (IP) address space that is separate from a public internet. The address may be a physical address, a media address control (MAC) address, or an IP address.

At step 250, AI controller 110 orchestrates (e.g., causes) the data set to be transferred from the data provider to the task provider via the established network connection. AI controller 110 may message the data provider to initiate the transfer. The message may include the data set, the task provider, and an address on private network 120 corresponding to the task provider. In some embodiments, the data provider may send an acknowledgement message to AI controller 110 indicating that the data set has been sent. In some embodiments, the task provider may acknowledge the transfer by sending a message to the data provider and/or AI controller 110. This is beneficial so that AI controller 110 can monitor the status of the task to ensure it is completed. This also helps to ensure that the established network connection is functioning.

At step 260, in response to the transfer, AI controller 110 orchestrates (e.g., causes) the task provider to execute the task using the data set. AI controller 110 may message the task provider to execute the task. The message may include the data set to use, and the task to perform. For example, the message may indicate that a machine learning model is to be trained using the data set received from the data provider. The task provider may then execute the task. For example, the task provider may train the machine learning model using the identified data set. In some embodiments, the task provider may send a message to AI controller 110 stating that the task is complete. In some embodiments, the task provider may fail to execute the task. Here, task provider may include details why the failure occurred in the message to AI controller 110.

Figure 3:
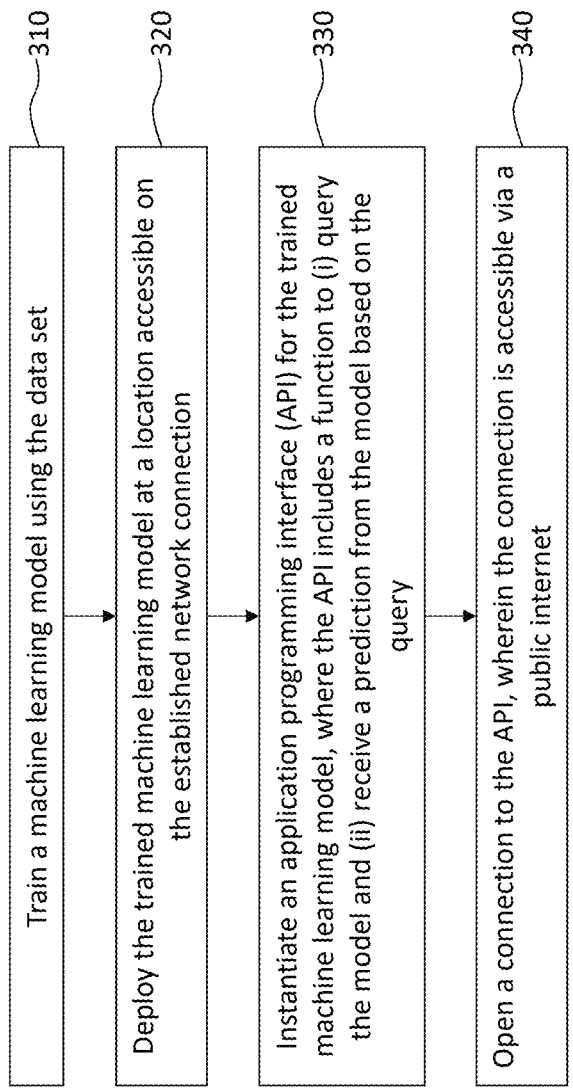
FIG. 3 is a flowchart illustrating a method for training and deploying a ML model using the private AI and data exchange, according to an embodiment.

FIG. 3 is a flowchart illustrating a method 300 for training and deploying a machine learning model using AI controller 110, according to an embodiment. Method 300 shall be described with reference to FIG. 1, however, method 300 shall not be limited to that example embodiment.

The foregoing description will describe an embodiment of the execution of method 300 with respect to AI controller 110. While method 300 is described with reference to AI controller 110, method 300 may be executed on any computing device, such as, for example, the computer system described with reference to FIG. 9 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 3.

At step 310, a machine learning model is trained using the data set. AI training center 140 may train the machine learning model. The data set may have been sent from data center 130 to AI training center 140 via the data plane at private network 120. The data may have been sent in response to a request from client device 160 to AI controller 110. Client device 160 may be associated with a customer, partner, provider, or end user of an entity on private network 120. For example, client device 160 may be associated with the owner of data at data center 130. The machine learning model may be any type of model including, but not limited to a linear regression model, random forest, neural network, decision tree, support vector machine, recurrent neural network, convolutional neural network, and transformer model. The model may be multi-modal, and therefore capable of inputting and outputting different types of data. For example, the model may be configured to input and/or output text, images, video, audio, sensor data or a combination thereof.

In some embodiments, the model may be distributed across multiple entities on private network 120. For example, the model may be split across three AI training centers 140. As a result, each AI training centers 140 may train a portion of the model on unique, overlapping, or equivalent data sets. Once trained, AI controller 110 may combine the portions by, for example, averaging the weights determined by each AI training center 140.

At step 320, the machine learning model is deployed at a location accessible on the established network connection. In some embodiments, AI training center 140 may deploy the trained model. For example, AI training center 140 may deploy the model at a resource (e.g., a local server) accessible by the owner of the model. In some embodiments, AI training center 140 may send the model to a deployment location (e.g., data center 130) on private network 120. The model may be sent within the data plane. In some embodiments, the model may be deployed in response to a request from client device 160. Client device 160 may be associated with a customer, partner, provider, or end user of an entity on private network 120. For example, client device 160 may be associated with the owner of data at data center 130 or the owner of the trained model.

In some embodiments, the model may be deployed in a distributed fashion throughout private network 120. For example, a first copy of the model may be at a first AI training center 140 and a second copy of the model may be at a second AI training center 140. Requests to the model may be routed between the copies of the models. AI controller 110 may perform the routing. Routing may be based on various factors such as physical distance between the requestor and each AI training center 140, private network's 120 average latency, private network's average throughput, and resource usage at each AI training center 140 (e.g., RAM, CPU, GPU, TPU, IPU, NPU usage). This may be beneficial for load balancing purposes so that not all the traffic to the model is occurring at a single entity (e.g., a single AI training center 140).

In some embodiments, a single model may be distributed between one or more entities on private network 120. For example, a single model may be represented by a set of weights or parameters. Subsets of the weights may be distributed across private network 120. For example, a first subset of weights may be at a first AI training center 140, and a second subset of weights may be at a second AI training center 140.

At 330, AI controller 110 instantiates an application programming interface (API) for the trained machine learning model. The API may include a function to (i) query the model and (ii) receive a prediction from the model based on the query. The query and response may vary based on the type of model. For example, the model may be an LLM trained to interpret prompts and generate responses.

At step 340, AI controller 110 opens a connection to the API, wherein the connection is accessible via a public internet. The public internet may be internet 190. AI controller 110 may open the connection and designate addresses for the API. Opening the API and designating addresses may be labeled as occurring at the control plane. AI controller 110 may send the API information to the entity hosting the model (e.g., AI training center 140), so that the entity can open the network connections for the API. For example, client device 160-2 may access the API via internet 190. Here, client device 160-2 may interact with the model via the API described above. For example, if the model is an LLM, client device 160-2 may submit a question and receive a response via internet 190. Interactions between client device 160-2 and the API may be designated as occurring via the experience plane. However, as stated above, all data sent via private network 120 occurs within the data plane.

As noted above, a single model may be represented by multiple weight subsets, where each subset is located at different entities on private network 120. Here, when AI controller 110 receives an API call to use the model, AI controller 110 may route data in the API call (e.g., the prompt) to each location storing a subset of the model. For example, AI controller 110 may copy the prompt and send it to each entity storing the subset of the model. Each model subset may generate an output such as a prediction or new content based on the input, and return the output to AI controller 110. In some embodiments, AI controller 110 may return each output to client device 160. In some embodiments, AI controller 110 may combine the outputs into a single output and return the single output to client device 160. For example, AI controller 110 may use a foundational model to consolidate the outputs into a single output.

In some embodiments, AI controller 110 may use interactions via the API to improve the model. For example, AI controller 110 orchestrate (e.g., cause) the entity hosting the model to save each query and corresponding response predicted by the model. The saved queries and responses may be used to further train and/or tune the model. For example, AI controller 110 may designate the queries and predictions to be saved at data center 130. AI controller 110 may further designate the training entity (e.g., AI training center 140) to retrain the model using the saved queries and predictions.

In some embodiments, AI controller 110 may obtain feedback to use as labels for the query and response. For example, AI controller 110 may ask client device 160-2 to rate or score the response generated by the model. AI controller 110 may use the rating or score as a label for the response. The label may then be used during model retraining.

In some embodiments, the model may be retrained and redeployed at various frequencies. For example, steps 320 and 330 may be repeated to retrain and redeploy the model. This is beneficial to ensure that the model produces increasingly accurate predictions. The model may be retrained at any frequency, and redeployed at any frequency. The frequency may be any frequency such as hourly, daily, weekly, monthly, or yearly. For example, the model may be trained using a data set at data center 130. Subsequently, additional data may be added to the data set. In response, the model may be retrained and redeployed. As an additional example, the model may be trained using data generated by a first IoT device 180. Subsequently, a second IoT device 180 may be deployed and begin generating data. In response, the model may be retrained using data from both IoT devices 180, and redeployed.

Figure 4:
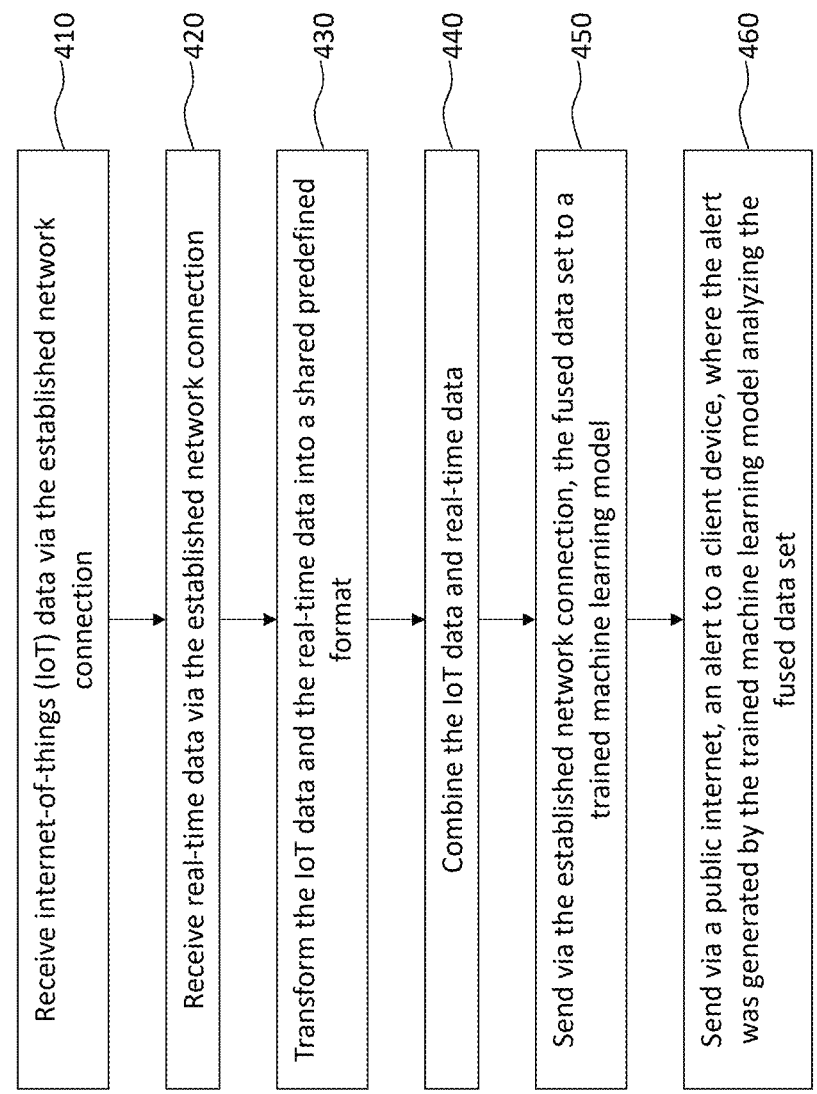
FIG. 4 is a flowchart illustrating a method for analyzing internet-of-things (IoT) and real time data on the private AI and data exchange, according to an embodiment.

FIG. 4 is a flowchart illustrating a method 400 for analyzing internet-of-things (IoT) and real time data on the private AI and data exchange, according to an embodiment. Method 400 shall be described with reference to FIG. 1, however, method 400 shall not be limited to that example embodiment.

The foregoing description will describe an embodiment of the execution of method 400 with respect to AI controller 110. While method 400 is described with reference to AI controller 110, method 400 may be executed on any computing device, such as, for example, the computer system described with reference to FIG. 8 and/or processing logic that may comprise hardware (e.g., circuitry, dedicated logic, programmable logic, microcode, etc.), software (e.g., instructions executing on a processing device), or a combination thereof.

It is to be appreciated that not all steps may be needed to perform the disclosure provided herein. Further, some of the steps may be performed simultaneously, or in a different order than shown in FIG. 4.

At step 410, internet-of-things (IoT) data is received via the established network connection. The data may be received via the data plane. The IoT data may be received by any entity on the established network connection such as AI controller 110, data center 130, AI training center 140, data transformer 150, client device 160, or model tuning center 170. In some embodiments, AI controller 110 may route the IoT data to a location (e.g., data center 130). The established network connection may be private network 120. In some embodiments, the established network connection may be internet 190. IoT data may be generated by any network connected device such as IoT device 180. An IoT device may include, but is not limited to, computers, TVs, speakers, cameras, microphones, thermostats, weather sensor, lighting systems, security systems, fire alarms, industrial sensors, and robotic sensors. Industrial and robotic sensors may relay industrial and robotic system information such as temperature, humidity, power, voltage, pressure, accelerometer data, gyroscope data, proximity data, infrared data, sound data, location data (e.g., GPS), and inertial measurement unit (IMU) data. The IoT data may be received from multiple different entities on private network 120 and/or internet 190. For example, a first IoT data may be received from weather sensors at a first location, and a second IoT data may be received from a retailer using IoT sensors to track inventory.

At step 420, real-time data is received via the established network connection. The data may be received via the data plane. The real-time data may be received by any entity on the established network connection such as AI controller 110, data center 130, AI training center 140, data transformer 150, client device 160, or model tuning center 170. In some embodiments, AI controller 110 may route the real-time data to a location (e.g., data center 130). The established network connection may be private network 120. The data may be received via the data plane. In some embodiments, the established network connection may be internet 190. The real-time data may be any data to be analyzed within AI exchange environment 100. For example, a retailer associated with client device 160-1 may provide real-time pricing data regarding products they sell. The real-time data may further include metadata, customer data, private data and/or partner ecosystem information (e.g., GPU load utilization, network latency, and network bandwidth usage).

At step 430, AI controller 110 transforms the IoT data and the real-time data into a shared predefined format. In some embodiments, AI controller 110 performs the transformation directly. In some embodiments, AI controller 110 may send or route the data to a data transformer such as data transformer 150. AI controller 110 may send the data via the data plane. As discussed above, the transformation may involve various steps such as: (1) projecting the data into shared format; (2) removing irrelevant data; (3) labelling the data; (4) cleaning the data; (5) feature engineering; (6) normalization; (7) encoding the data; (8) generating embeddings; and (9) temporal aggregation and alignment.

The transformation may also involve various functions such as upsampling, downsampling, linear transformation, mirroring, rotating, and smoothing, the data. Transformation may further involve labeling the data. For example, each data may be labelled with a source. For example, IoT data may be labelled with the type of IoT device that created the data, an identifier of the IoT device, and the location of the IoT device. Real-time data may be labelled with the type of data (e.g., product price) and a source of the data (e.g., Retailer A).

At step 440, AI controller 110 combines the IoT data and the real-time data. AI controller 110 may directly combine the data. In some embodiments, AI controller 110 may cause the entity that transformed the data (e.g., data transformer 150) to combine the IoT data and the real-time data. Here, AI controller 110 may send a message to data transformer 150 to combine the data. Combining the IoT data and real-time data allows it to be analyzed together. The IoT data and real-time data may be concatenated into a matrix or a series of vectors.

At step 450, AI controller 110 sends via the established network connection, the fused data set to a trained machine learning model. In some embodiments, AI controller 110 may directly send the fused data set to the trained machine learning model. In some embodiments, AI controller 110 may orchestrate the fused data set to be sent to the trained machine learning model. For example, AI controller 110 may send a message to data transformer 150 to send the fused data set to the trained machine learning model. The fused data set may be sent via the data plane. The trained machine learning model may be located at any location on private network 120. The model may be trained to generate inferences or predictions based on the received data. The model may be multi-modal, capable of inputting and outputting data with various formats, such as text, images, video, sensor data, audio data, or a combination thereof.

At step 460, AI controller 110 sends via a public internet, an alert to a client device, where the alert was generated by the trained machine learning model analyzing the fused data set. The public internet may be internet 190 and the client device may be client device 160-2. In some embodiments, AI controller 110 may directly send the alert. In some embodiments, AI controller may orchestrate the alert to be sent. For example, AI controller 110 may send a message to the entity hosting the model (e.g., data center 130), to alert client device 160-2 based on the model's predictions. The alert may include a prediction from the model based off of the fused data. For example, the alert may include that an anomaly within the fused data was detected. An alert may include a recommendation. For example, IoT data may include weather information, and the real-time data may include current retailer prices. The model may predict a storm is imminent, and that the retailer's prices should be lowered in order to further incentivize sales prior to the storm's arrival.

In some embodiments, retrieval augmented generation (RAG) may be used as part of the model's prediction. For example, the model may leverage a RAG agent, such as RAG agent 192-2, to retrieve real-time weather data from weather reporting services. This technique is beneficial to improve the accuracy of the model's predictions by including addition data sources. For example, if IoT and RAG agent data both include similar weather information, the model's prediction may be generated with higher confidence than if only the IoT data or RAG agent data were used.

In some embodiments, AI controller 110 may utilize automated model observability to receive feedback for the model's prediction. For example, AI controller 110 may request feedback from client device 160-2 based off of the alert. The feedback may be in any form such as a numerical rating on a scale or a textual description. AI controller 110 may use the feedback to update the machine learning model. For example, client device 160-2 may indicate, via a rating, that the model's prediction was incorrect. AI controller 110 may use the prediction and the rating, to retrain the machine learning model.

Figure 5:
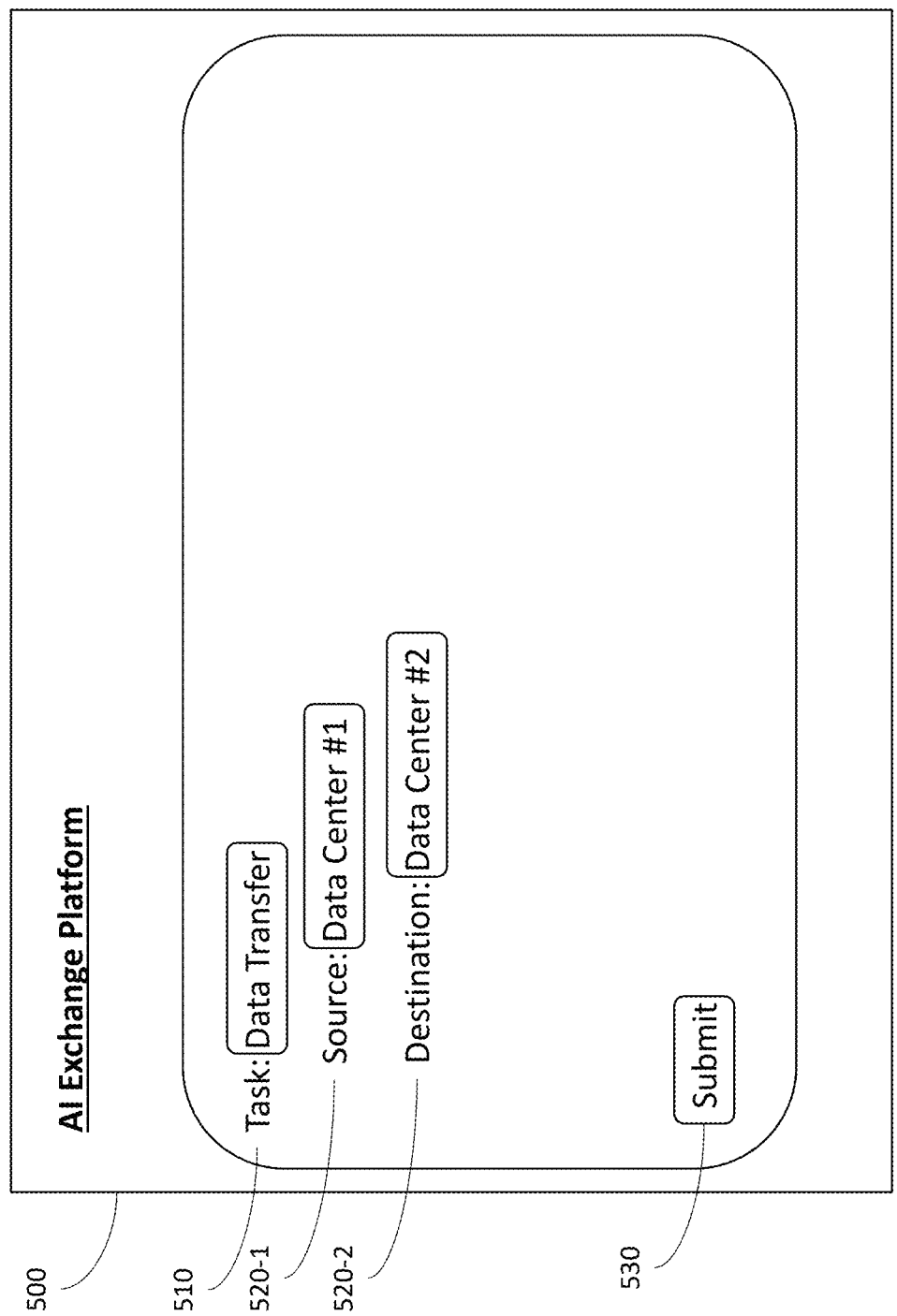
FIGS. 5-7 are exemplary interfaces for configuring an AI controller, according to embodiments.

FIG. 5 depicts an exemplary interface 500 for using AI controller 110, according to some embodiments. AI controller 110 may host interface 500. Interface 500 may be accessible via private network 120 and/or internet 190. For example, client device 160-1 may access interface 500 via private network 120 whereas client device 160-2 may access interface 500 via internet 190. Interface 500 includes task 510, task details 520, and submit 530.

Task 510 may be allow client device 160 to select a task for AI controller 110 to execute. Task 510 may include, but is not limited to, data ingestion (e.g., data transfer), data transformation, model training, model tuning, model deployment, enabling retrieval augmented generation, data fusion, and model utilization (e.g., generating predictions with model). Task details 520 may depend on task 510. For example, if task 510 is data transfer, AI controller 110 be configured to request task details 520 corresponding to a source 520-1 (e.g., a data provider) and a destination 520-2. Submit 530 may be a button that when interacted with, causes AI controller 110 to execute task 510 using task details 520. For example, if task 510 is a data transfer, AI controller 110 may cause the data to be transferred from source 520-1 to destination 520-2. AI controller 110 may orchestrate the data to be transferred via private network 120.

Figure 6:
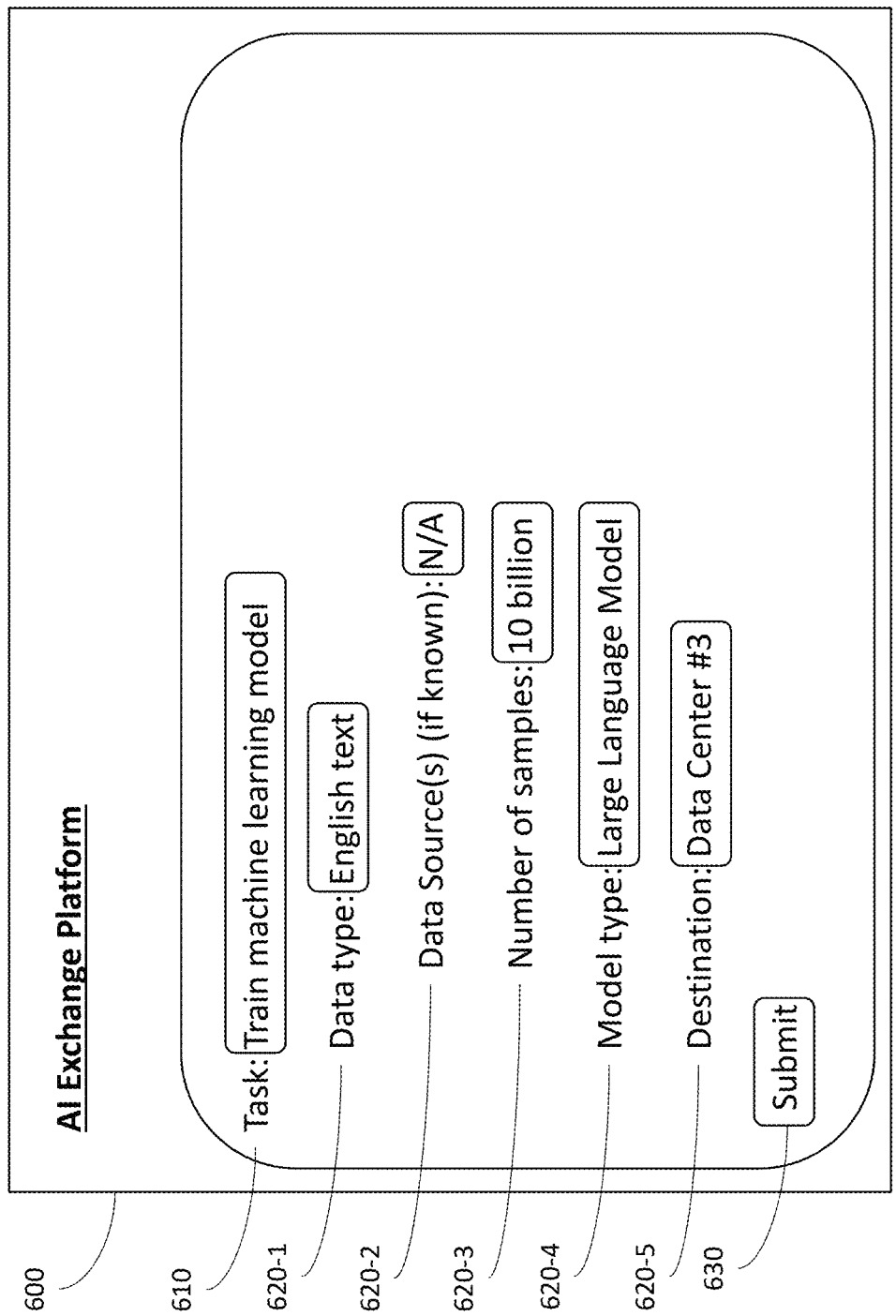

FIG. 6 depicts an exemplary interface 600 for using AI controller 110, according to some embodiments. Interface 600 may be accessible via private network 120 and/or internet 190. For example, client device 160-1 may access interface 600 via private network 120 whereas client device 160-2 may access interface 600 via internet 190. Interface 600 includes task 610, task details 620, and submit 630.

Interface 600 may be used to describe and submit task 610, where certain task details 620 are unknown. For example, client device 160 may wish to train a machine learning model, but not have the hardware resources to perform the training. Here, client device 160 may use AI controller 110 to locate a facility with the required hardware to perform the training. As another example, client device 160 may wish to train a machine learning model, but needs additional data. Here, client device 160 may use interface 600 to describe the desired data, so that AI controller 110 may locate it within private network 120, and provide access to client device 160.

Similar to interface 500, task 610 may include, but is not limited to, data ingestion (e.g., data transfer), data transformation, model training, model tuning, model deployment, enabling retrieval augmented generation, data fusion, and model utilization (e.g., generating predictions with model). Task details 620 may depend on task 610. For example, task 610 may be to train a machine learning model. As a result, task details 620 may include data type 620-1, data source(s) (if known) 620-2, number of samples 620-3, model type 620-4, and destination 620-5 describing the location where the model should be deployed.

Submit 630 may be a button that when interacted with, causes AI controller 110 to execute task 610 using task details 620. For example, if task 610 is training a model, AI controller 110 may orchestrate the model to be trained using the data identified in task details 620, and deploy the model to destination 620-5.

Figure 7:
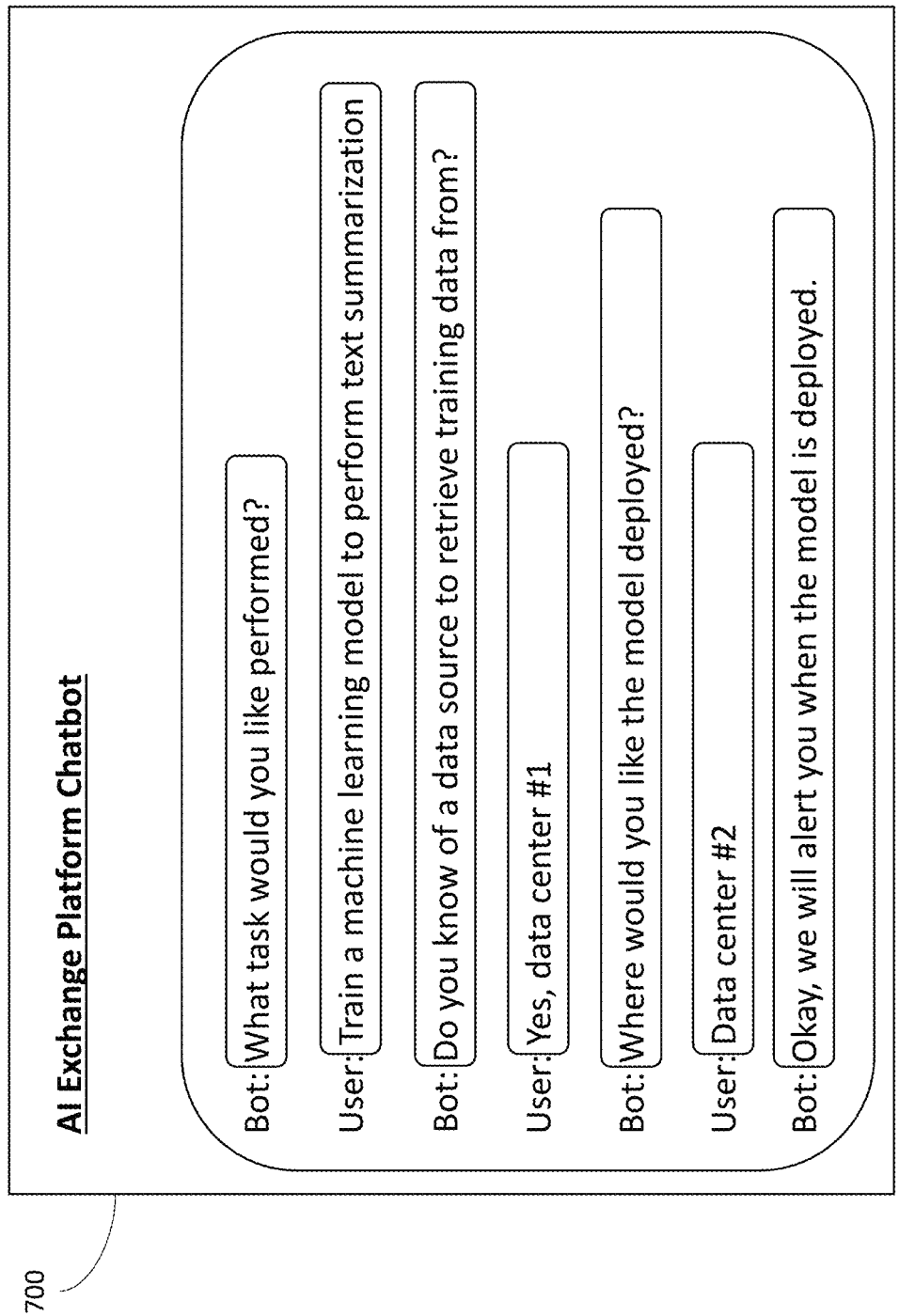

FIG. 7 depicts an exemplary interface 700 for using AI controller 110 via a chatbot, according to some embodiments. Interface 700 may be accessible via private network 120 and/or internet 190. For example, client device 160-1 may access interface 700 via private network 120 whereas client device 160-2 may access interface 700 via internet 190.

Client device 160 may use interface 700 to interface with a chatbot hosted by AI controller 110. The chatbot may be an LLM. Client device 160 may communicate with the chatbot to cause AI controller 110 to perform various tasks. For example, client device 160 may tell the chatbot to train a machine learning model to perform text summarization. Client device 160 may further specify data sources for training as well as a location to deploy the trained model. In response, AI controller 110 may locate the data, send it to a training location (e.g., AI training center 140), and deploy the trained model at the specified location.

Figure 8:
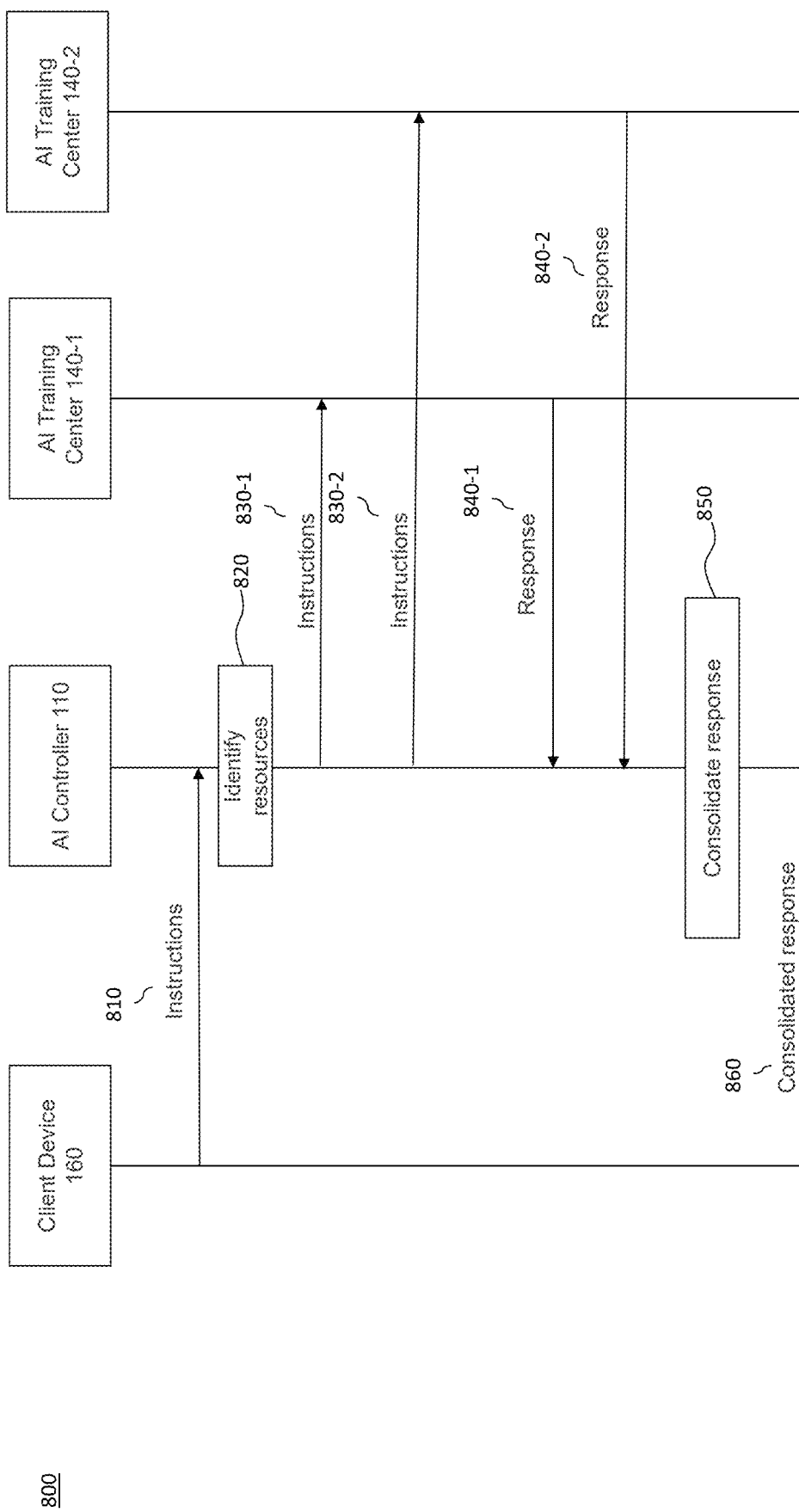
FIG. 8 depicts a diagram illustrating utilizing multiple machine learning models, according to embodiments.

FIG. 8 depicts a diagram 800 illustrating utilizing multiple machine learning models, according to embodiments.

At 810, client device 160 submits instructions. Client device 160 may send instructions to AI controller 110 via private network 120. In some embodiments, client device 160 may utilize a graphical user interface to interact with AI controller 110 and submit the instructions. In some embodiments, client device 160 may communicate with AI controller 110 using an API. In some embodiments, the API may be a representational state transfer (REST) API. In some embodiments, the API may be a web API. In some embodiments, the instructions may be a prompt for a machine learning model. The prompt may be a request such as a request to summarize a piece of data, or to generate new content (e.g., generate a song, generate a novel, generate a video, or generate an image). In some embodiments, client device 160 may include data in the instructions. In some embodiments, client device 160 may provide a location on private network 120 storing data to use. For example, client device 160 may specify data at data center 130 for the model to use. In some embodiments, the instructions may be a request to train a machine learning model. Here, the instructions may further include a specification of the model such as the type of model to train, what data to use in training, and training hyperparameters. Hyperparameters may include learning rate, number of layers, number of epoch, and/or batch size.

At 820, AI controller 110 identifies resources based on the instructions. If the instructions are a prompt, AI controller 110 may identify a machine learning model on private network 120 configured to respond to the prompt. For example, if the prompt was a request to summarize a novel, AI controller 110 may identify a machine learning model on private network 120 trained to perform text summarization. As discussed above, AI controller 110 may include a manifest identifying the entities (e.g., models) on private network 120 and their capabilities (e.g., natural language processing, image processing). In some embodiments, AI controller 110 may identify multiple machine learning models to respond to the instructions. For example, AI controller 110 may parse the instructions and determine the instructions involve multiple different model types. For example, the instructions may include a natural language component and an image processing component. In response, AI controller 110 may identify a first model configured to perform natural language processing and a second model configured to perform image processing. The machine learning models may be located at the same physical entity on private network 120, or at different entities. For example, the first model may be located at a first AI training center 140-1, and the second model may be located at a second AI training center 140-2. In some embodiments, AI controller 110 may use a machine learning model to parse the instructions, and determine whether multiple machine learning models should be utilized. For example, AI controller 110 may use an LLM to parse the prompt and map components of the prompt to models on private network 120.

Similarly, if the instructions are to train a machine learning model, AI controller 110 may identify resources such as AI training center 140 configured to train the model. AI controller 110 may identify a resource to train the model based off of the type of model to train, a size of the data set to use for training, a type of data used for training (e.g., image, text), and/or a hyperparameter to use during training. In some embodiments, AI controller 110 may identify multiple resources to train the model. For example, AI controller 110 may identify two AI training centers 140 (e.g., first AI training center 140-1 and second AI training center 140-2) to train the model. AI controller 110 may identify resources to train the model based off of the instructions, current resource usage, or a combination thereof. For example, the instructions may include a request to use multiple AI training centers 140 to train the model. Similarly, AI controller 110 may determine that based on current computing resource usage at each individual AI training center 140 that a single AI training center 140 may be insufficient to train the model. For example, each available AI training center 140 may lack the available computing resources to train the model as specified. As a result, AI controller 110 may designate multiple AI training centers 140 to train the model.

At 830, AI controller sends the instructions to the identified resources. For example, at 830-1 AI controller 110 may send the instructions a first AI training center 140-1. At 830-2, AI controller 110 may send the instructions to a second AI training center 140-2.

At 840, AI controller receives a response. AI controller 110 may receive a response from each model. For example at 840-1 AI controller 110 receives a response from the model at AI training center 140-1, and at 840-2 AI controller 110 receives a response from the model at AI training center 140-2. The response may vary based on the instructions. For example, if the instructions included a prompt to perform a task (e.g., answer a question, summarize a document), then the response may be the completed task (e.g., the answer, the summary).

Similarly, if the instructions included a request to train a model, then the response may be a message indicating that the model is trained. In some embodiments, the response may further include model parameters, training data, and training performance (e.g., precision, recall, F1 score).

At 850, AI controller 110 consolidates the response. If the instructions included a prompt, and AI controller 110 used multiple models to respond to the prompt, AI controller 110 may package the multiple responses together (e.g., in a single data structure). In some embodiments, AI controller 110 may use a machine learning model such as a foundational model (e.g., an LLM) to summarize the multiple responses it received at 840-1 and 840-2. For example, if the response at 840-1 included a summary of a text, and the response at 840-2 included a summary of an image, AI controller 110 may use the foundational model to generate a single response incorporating both summaries.

If the instructions included a request to train a model, AI controller 110 may evaluate the response to determine whether to continue training or not. For example, AI controller 110 compare training performance metric (e.g., F1 score) to a predefined training performance metric to determine whether to continue training. In an embodiment where multiple models are used for training, AI controller 110 may average the training performance metrics received for each model and then perform the comparison. In some embodiments, when a performance metric is below a predefined threshold, AI controller 110 may transmit a message to AI training center 140 to perform additional training. Similarly, AI controller 110 may transmit a message to AI training center 140 to stop training when a performance metric is greater than or equal to a predefined threshold.

In some embodiments, the model may remain at the AI training center 140 that trained the model. Noted above, AI controller 110 may use multiple AI training centers 140 to train a single model. Models at each AI training center 140 may train on different training data examples and send the model parameters in the response. AI controller 110 may combine the models from each AI training center 140. For example, AI controller 110 may use a single entity (e.g., AI training center 140) to consolidate the model parameters by taking the average of all the model parameters and distributing the averaged parameters to each AI training center 140. In some embodiments, AI controller 110 may transmit an indication to use a weighted average when consolidating the model parameters. For example, AI controller 110 may provide an indication to weight the parameters of a model based on a number of training data examples the model trained on, the number of epochs the model trained for, a performance metric of the model, a hyperparameter of the model, or any combination thereof. For example, if the model from AI training center 140-1 had an F1 score of 0.91, and model from AI training center 140-2 had an F1 score of 0.85, AI controller 110 may cause a weight (e.g., 1.1) to be applied to the parameters from AI training center 140-1 when computing the average parameters for the final, consolidated model. The resulting model will thus include more influence from the higher performing model generated by AI training center 140-1.

At 860, AI controller 110 sends the consolidated response to client device 160. The consolidated response may be responsive to the prompt in the instructions. For example, if the instructions were a prompt to summarize a piece of text, the consolidated response may include the text summary generated by a machine learning model on private network 120. In some embodiments, the consolidated response may be an indication that the requested model is trained. The consolidated response may further include a link of where to access the trained model on private network 120, model performance, and model statistics such as the number of items trained on, training hyperparameters, and amount of computing resources used in training.

Although diagram 800 was discussed showing a single client device 160, AI controller 110, and two AI training centers 140, any number of other devices, for example as illustrated in FIG. 1, may be used. For example, AI controller 110 may utilize model tuning center 170 to tune the model before providing the trained model to client device 160.

Figure 9:
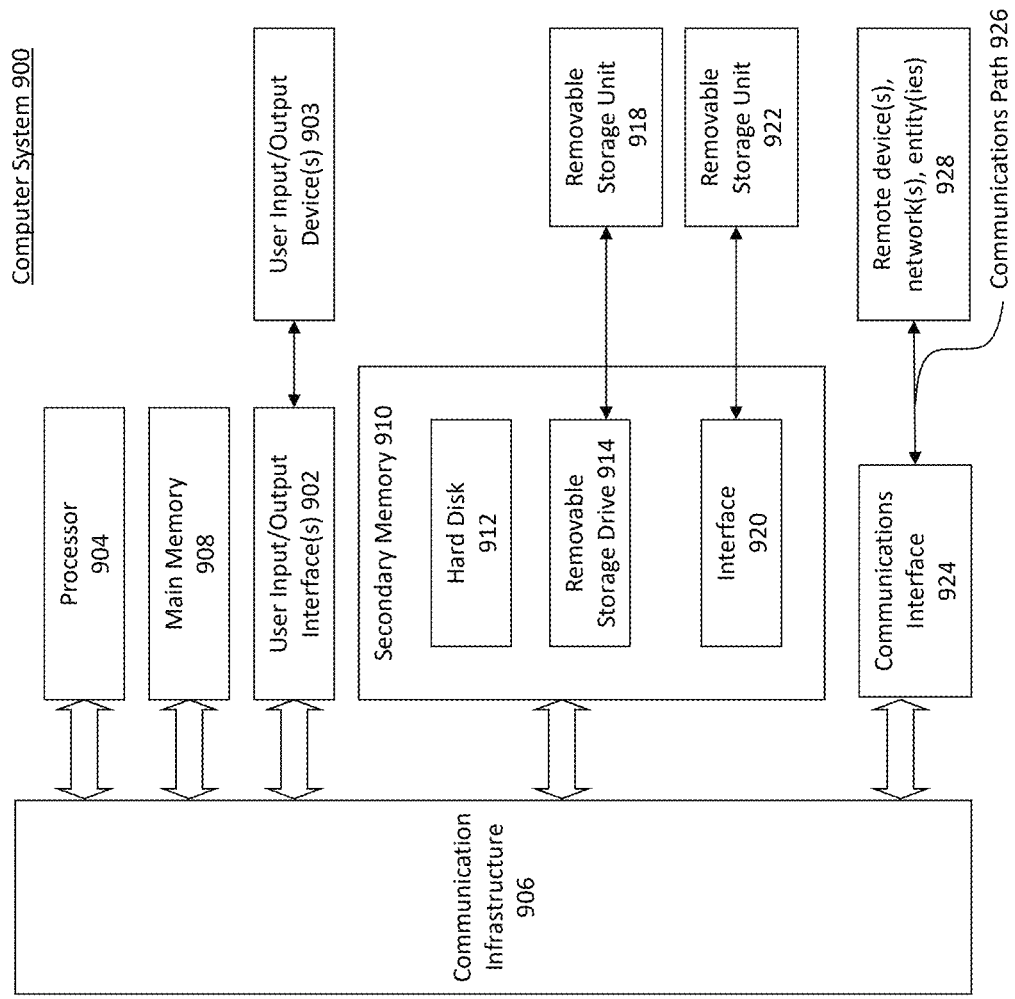
FIG. 9 depicts an example computer system useful for implementing various embodiments.

Various embodiments may be implemented, for example, using one or more well-known computer systems, such as computer system 900 shown in FIG. 9. One or more computer systems 900 may be used, for example, to implement any of the embodiments discussed herein, as well as combinations and sub-combinations thereof.

Computer system 900 may include one or more processors (also called central processing units, or CPUs), such as a processor 904. Processor 904 may be connected to a communication infrastructure or bus 906.

Computer system 900 may also include user input/output device(s) 903, such as monitors, keyboards, pointing devices, etc., which may communicate with communication infrastructure 906 through user input/output interface(s) 902.

One or more of processors 904 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 900 may also include a main or primary memory 908, such as random access memory (RAM). Main memory 908 may include one or more levels of cache. Main memory 908 may have stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 may include a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 may read from and/or write to removable storage unit 918.

Secondary memory 910 may include other means, devices, components, instrumentalities or other approaches for allowing computer programs and/or other instructions and/or data to be accessed by computer system 900. Such means, devices, components, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 may enable computer system 900 to communicate and interact with any combination of external devices, external networks, external entities, etc. (individually and collectively referenced by reference number 928). For example, communication interface 924 may allow computer system 900 to communicate with external or remote devices 928 over communications path 926, which may be wired and/or wireless (or a combination thereof), and which may include any combination of LANs, WANs, the Internet, etc. Control logic and/or data may be transmitted to and from computer system 900 via communication path 926.

Computer system 900 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 900 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 900 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 900, main memory 908, secondary memory 910, and removable storage units 918 and 922, as well as tangible articles of manufacture embodying any combination of the foregoing. Such control logic, when executed by one or more data processing devices (such as computer system 900), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 9. In particular, embodiments can operate with software, hardware, and/or operating system implementations other than those described herein.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention(s) are defined solely by the appended claims including any amendments made during the pendency of this application and all equivalents of those claims as issued.

Identifiers, such as "(a)," "(b)," "(i)," "(ii)," etc., are sometimes used for different elements or steps. These identifiers are used for clarity and do not necessarily designate an order for the elements or steps.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, or contains a list of elements, does not include only those elements but may include other elements not expressly listed or inherent to such process, method, article, or apparatus. An element preceded by "comprises . . . a", "has . . . a", "includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural forms can be used, but it does not limit the scope of the disclosure and the same teaching can apply to multiple objects, even if in the current application an object is referred to in its singular form.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment in at least some instances. Thus, the following claims are hereby incorporated into the Detailed Description, with each claim standing on its own as separately claimed subject matter.

What is claimed is:

1. A method for providing an environment of a plurality of data centers for privately exchanging and processing data, comprising:
receiving, at a computing device, an identification of (i) a machine learning model to train and (ii) a characteristic describing data needed to train the machine learning model, wherein the plurality of data centers provide physical computer server space and network connectivity services for a plurality of customers of the plurality of data centers;
locating, by the computing device, a data provider within the environment such that the located data provider has access to a data set according to the characteristic,
wherein the data provider is provided by a first customer of the plurality of customers within the environment, and
wherein the data provider is located at a first data center of the plurality of data centers;
locating, by the computing device, a task provider within the environment such that the located task provider is configured to train the machine learning model,
wherein the task provider is provided by a second customer of the plurality of customers,
wherein the task provider is located at a second data center of the plurality of data centers, and wherein the second customer is different from the first customer;

establishing, by the computing device, a real-time, private, and secure network connection between the data provider and the task provider such that the data provider and the task provider are able to communicate with one another via the network connection without using publicly accessible network addresses, wherein each of the plurality of data centers is connected to the established network connection;

orchestrating, by the computing device, the data set to be transferred from the data provider to the task provider via the established network connection; and in response to the transfer, orchestrating, by the computing device, the task provider to:
train the machine learning model using the data set; and
deploy the trained machine learning model at a location accessible on the established network connection.

2. The method of claim 1, wherein the data set is spread across a plurality of locations, and the method further comprises causing, by the computing device, the task provider to transform the data set into a shared format prior to training the machine learning model.

3. The method of claim 1, wherein the network connection is private and secure via one or more of a private physical Open Systems Interconnection (OSI) layer 1 connection, a private Ethernet OSI layer 2 connection, or a private Internet Protocol address space that is separate from a public internet.

4. The method of claim 3, wherein the private Ethernet OSI layer 2 connection is distributed Ethernet, ultra-Ethernet traffic, InfiniBand, Tesla Transport Protocol over Ethernet traffic, RDMA over Converged Ethernet, bottleneck, bandwidth, and round-trip (BBR) congestion control, or sparse wrapper algorithm.

5. The method of claim 1, further comprising:
instantiating, by the computing device, an application programming interface (API) for the trained machine learning model, wherein the API includes a function to (i) query the trained machine learning model and (ii) receive a prediction from the trained machine learning model based on the query; and
opening, by the computing device, a connection to the API, wherein the connection is accessible via a public internet.

6. The method of claim 1, further comprising:
receiving, at the computing device, internet-of-things (IoT) data via the established network connection;
receiving, at the computing device, real-time data via the established network connection;
creating, by the computing device, a fused data set by:
transforming the IoT data and the real-time data into a shared predefined format; and
combining the IoT data and the real-time data;
sending, by the computing device via the established network connection, the fused data set to the trained machine learning model; and
sending, by the computing device via a public internet, an alert to a client device, wherein the alert was generated by the trained machine learning model analyzing the fused data set.

7. The method of claim 1, wherein the task provider comprises a plurality of AI training centers, and wherein each of the plurality of AI training centers is connected to the established network connection.

8. The method of claim 7, wherein prior to deploying the trained machine learning model, the method further comprises:
receiving, at the computing device, a plurality of trained machine learning models from the plurality of AI training centers; and
combining the plurality of trained machine learning models into the machine learning model.

9. The method of claim 7, wherein the plurality of AI training centers are identified based at least on a type of the machine learning model, a size of the data set, a type of data in the data set, a hyperparameter of the machine learning model, or an available computing resource at each of the plurality of AI training centers.

10. The method of claim 1, wherein the data set comprises a first training data set and a second training data set, wherein the trained machine learning model is a trained first machine learning model, wherein the trained first machine learning model is trained using the first training data set, wherein the location is a first location, and wherein the method further comprises:
training, by the task provider, a second machine learning model using the second training data set; and
deploying, by the task provider, the trained second machine learning model at a second location accessible on the established network connection.

11. The method of claim 10, further comprising:
receiving, at the computing device, a multi-modal prompt from a client device;
mapping, by the computing device, a first part of the multi-modal prompt to the trained first machine learning model, wherein the mapping is based at least on a request in the multi-modal prompt and a first data type in the multi-modal prompt;
mapping, by the computing device, a second part of the multi-modal prompt to the trained second machine learning model, wherein the mapping is based at least on the request in the multi-modal prompt and a second data type in the multi-modal prompt;
receiving, at the computing device, a first response from the trained first machine learning model responsive to transmitting the first part of the multi-modal prompt to the trained first machine learning model at the first location;
receiving, at the computing device, a second response from the trained second machine learning model responsive to transmitting the second part of the multi-modal prompt to the trained second machine learning model at the second location;
combining, by the computing device, the first response and the second response; and
transmitting, by the computing device, the combined first response and second response to the client device.

12. The method of claim 1, wherein the machine learning model to train and the characteristic are received via a chatbot hosted by the computing device, and wherein the chatbot is (i) a trained large language model and (ii) is accessible via both a public internet and the established network connection.

13. The method of claim 1, wherein the machine learning model to train and the characteristic are received via a graphical user interface (GUI) hosted by the computing device, wherein the GUI is accessible via both a public internet and the established network connection.

14. A system for providing an environment of a plurality of data centers for privately exchanging and processing data, comprising:
- a memory; and
- at least one processor coupled to the memory and configured to:
  - receive an identification of (i) a task to perform and (ii) a characteristic describing data needed to execute the task, wherein the plurality of data centers provide physical computer server space and network connectivity services for a plurality of customers of the plurality of data centers;
  - locate a data provider within the environment such that the located data provider has access to a data set according to the characteristic,
    - wherein the data provider is provided by a first customer of the plurality of customers within the environment,
    - wherein the data provider is located at a first data center of the plurality of data centers, and
    - wherein the data set comprises a first training data set and a second training data set;
  - locate a task provider within the environment such that the located task provider is configured to execute the task,
    - wherein the task provider is provided by a second customer of the plurality of customers,
    - wherein the task provider is located at a second data center of the plurality of data centers, and
    - wherein the second customer is different from the first customer;
  - establish a real-time, private, and secure network connection between the data provider and the task provider such that the data provider and the task provider are able to communicate with one another via the network connection without using publicly accessible network addresses;
  - orchestrate the data set to be transferred from the data provider to the task provider via the established network connection; and
  - in response to the transfer, orchestrate the task provider to:
    - train a first machine learning model using the first training data set;
    - deploy the trained first machine learning model at a first location accessible on the established network connection;
    - train a second machine learning model using the second training data set; and
    - deploy the trained second machine learning model at a second location accessible on the established network connection.

15. The system of claim 14, wherein the network connection is private and secure via one or more of a private physical Open Systems Interconnection (OSI) layer 1 connection, a private Ethernet OSI layer 2 connection, or a private Internet Protocol address space that is separate from a public internet.

16. The system of claim 14, wherein the at least one processor is further configured to:
- instantiate an application programming interface (API) for the trained first machine learning model, wherein the API includes a function to (i) query the trained first machine learning model and (ii) receive a prediction from the trained first machine learning model based on the query; and
- open a connection to the API, wherein the connection is accessible via a public internet.

17. The system of claim 14, wherein the at least one processor is further configured to:
- receive internet-of-things (IoT) data via the established network connection;
- receive real-time data via the established network connection;
- create a fused data set by:
  - transforming the IoT data and the real-time data into a shared predefined format; and
  - combining the IoT data and the real-time data;
- send via the established network connection, the fused data set to the trained first machine learning model; and
- send via a public internet, an alert to a client device, wherein the alert was generated by the trained first machine learning model analyzing the fused data set.

18. A method for providing an environment for privately exchanging and processing data to perform AI tasks, comprising:
- receiving, at a computing device, an identification of (i) a machine learning model to train and (ii) a characteristic describing data needed to train the machine learning model;
- locating, by the computing device, a data provider within the environment such that the located data provider has access to a data set according to the characteristic;
- locating, by the computing device, a task provider within the environment such that the located task provider is configured to train the machine learning model, wherein the task provider comprises a plurality of AI training centers;
- establishing, by the computing device, a real-time, private, and secure network connection between the data provider and the task provider such that the data provider and the task provider are able to communicate with one another via the network connection without using publicly accessible network addresses, wherein each of the plurality of AI training centers is connected to the established network connection;
- orchestrating, by the computing device, the data set to be transferred from the data provider to the task provider via the established network connection; and
- in response to the transfer, orchestrating, by the computing device, the task provider to:
  - train the machine learning model using the data set; and
  - deploy the trained machine learning model at a location accessible on the established network connection.

19. The method of claim 18, further comprising:
- instantiating, by the computing device, an application programming interface (API) for the trained machine learning model, wherein the API includes a function to (i) query the trained machine learning model and (ii) receive a prediction from the trained machine learning model based on the query; and
- opening, by the computing device, a connection to the API, wherein the connection is accessible via a public internet.

20. The method of claim 18, further comprising:
- receiving, at the computing device, internet-of-things (IoT) data via the established network connection;
- receiving, at the computing device, real-time data via the established network connection;
- creating, by the computing device, a fused data set by:
  - transforming the IoT data and the real-time data into a shared predefined format; and
  - combining the IoT data and the real-time data;

sending, by the computing device via the established network connection, the fused data set to the trained machine learning model; and sending, by the computing device via a public internet, an alert to a client device, wherein the alert was generated by the trained machine learning model analyzing the fused data set.

21. The method of claim 18, wherein prior to deploying the trained machine learning model, the method further comprises:

receiving, at the computing device, a plurality of trained machine learning models from the plurality of AI training centers; and combining the plurality of trained machine learning models into the machine learning model.

22. The method of claim 18, wherein the plurality of AI training centers are identified based at least on a type of the machine learning model, a size of the data set, a type of data in the data set, a hyperparameter of the machine learning model, or an available computing resource at each of the plurality of AI training centers.

23. The method of claim 18, wherein the data set comprises a first training data set and a second training data set, wherein the trained machine learning model is a trained first machine learning model, wherein the trained first machine learning model is trained using the first training data set, wherein the location is a first location, and wherein the method further comprises:

training, by the task provider, a second machine learning model using the second training data set; and deploying, by the task provider, the trained second machine learning model at a second location accessible on the established network connection.

24. A method for providing an environment for privately exchanging and processing data to perform AI tasks, comprising:

receiving, at a computing device, an identification of (i) a task to perform and (ii) a characteristic describing data needed to execute the task;

locating, by the computing device, a data provider within the environment such that the located data provider has access to a data set according to the characteristic, wherein the data set comprises a first training data set and a second training data set;

locating, by the computing device, a task provider within the environment such that the located task provider is configured to execute the task;

establishing, by the computing device, a real-time, private, and secure network connection between the data provider and the task provider such that the data provider and the task provider are able to communicate with one another via the network connection without using publicly accessible network addresses;

orchestrating, by the computing device, the data set to be transferred from the data provider to the task provider via the established network connection; and in response to the transfer, orchestrating, by the computing device, the task provider to:

train a first machine learning model using the first training data set;

deploy the trained first machine learning model at a first location accessible on the established network connection;

train a second machine learning model using the second training data set; and deploy the trained second machine learning model at a second location accessible on the established network connection.

25. The method of claim 24, further comprising:

receiving, at the computing device, internet-of-things (IoT) data via the established network connection;

receiving, at the computing device, real-time data via the established network connection;

creating, by the computing device, a fused data set by:

transforming the IoT data and the real-time data into a shared predefined format; and combining the IoT data and the real-time data;

sending, by the computing device via the established network connection, the fused data set to the first trained machine learning model; and sending, by the computing device via a public internet, an alert to a client device, wherein the alert was generated by the first trained machine learning model analyzing the fused data set.

26. The method of claim 24, wherein the task provider comprises a plurality of AI training centers, and wherein each of the plurality of AI training centers is connected to the established network connection.

27. The method of claim 26, wherein the plurality of AI training centers are identified based at least on a type of the first machine learning model or a type of the second machine learning model, a size of the data set, a type of data in the data set, a hyperparameter of a machine learning model, or an available computing resource at each of the plurality of AI training centers.

28. The method of claim 11, wherein combining the first response and the second response comprises applying a weight to the first response and the second response.

* * * * *